United States Patent
Igeta et al.

(10) Patent No.: US 7,599,027 B2
(45) Date of Patent: Oct. 6, 2009

(54) TRANSFLECTIVE LIQUID CRYSTAL DISPLAY DEVICE

(75) Inventors: Koichi Igeta, Chiba (JP); Hitoshi Komeno, Mobara (JP); Shinichi Komura, Mobara (JP); Shoichi Hirota, Hitachi (JP); Osamu Itou, Hitachi (JP); Shinichiro Oka, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 179 days.

(21) Appl. No.: 11/976,832

(22) Filed: Oct. 29, 2007

(65) Prior Publication Data

US 2008/0100785 A1    May 1, 2008

(30) Foreign Application Priority Data

Oct. 30, 2006    (JP) .............................. 2006-294472

(51) Int. Cl.
*G02F 1/1335*    (2006.01)
*G02F 1/1343*    (2006.01)

(52) U.S. Cl. ........................ 349/114; 349/139

(58) Field of Classification Search .................. 349/43, 349/110, 113, 114, 139
See application file for complete search history.

(56) References Cited

U.S. PATENT DOCUMENTS 7,486,360 B2 *    2/2009    Kim ............................ 349/114
7,492,425 B2 *    2/2009    Sakai .......................... 349/114

FOREIGN PATENT DOCUMENTS

JP    2006-171376    12/2004

* cited by examiner

*Primary Examiner*—David Nelms
*Assistant Examiner*—David Y Chung
(74) *Attorney, Agent, or Firm*—Stites & Harbison PLLC; Juan Carlos A. Marquez, Esq.

(57) ABSTRACT

A transflective liquid crystal display device includes a liquid crystal display panel having a first substrate, a second substrate, and a liquid crystal interposed between the first substrate and the second substrate in which the liquid crystal display panel includes a plurality of subpixels having a transmissive portion and a reflective portion, wherein the transmissive portion of each of the plurality of subpixels includes a first common electrode formed on the first substrate, and a transmissive pixel electrode formed on the first common electrode through an interlayer insulating film, wherein the transmissive pixel electrode has a plurality of pectinate electrodes or slits, and wherein the reflective portion of each of the plurality of subpixels includes a reflective electrode formed on the first common electrode, a planar reflective pixel electrode formed on the first common electrode through the interlayer insulating film, second common electrodes formed on the second substrate, and a retarder formed between the second common electrodes and the second substrate.

20 Claims, 37 Drawing Sheets

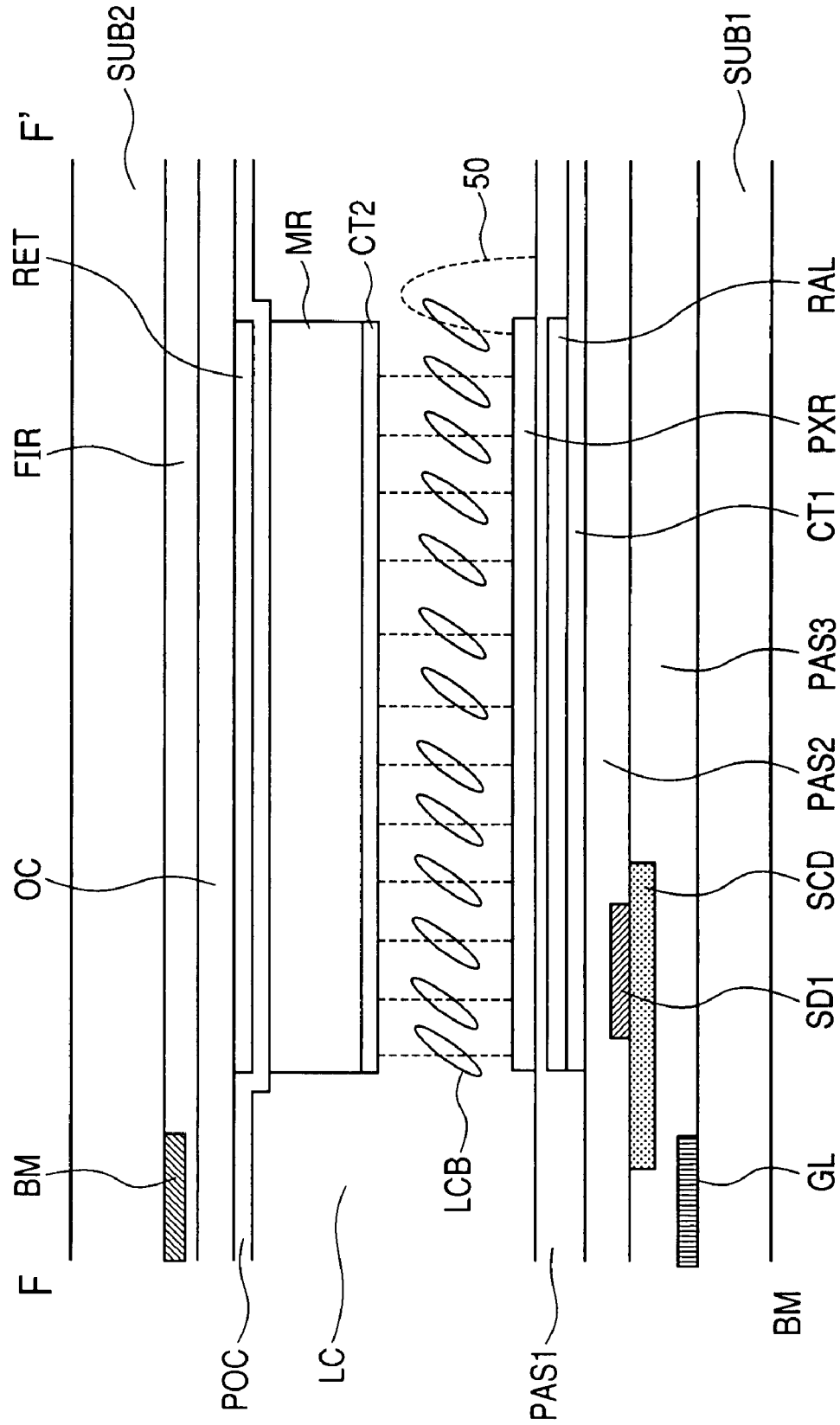

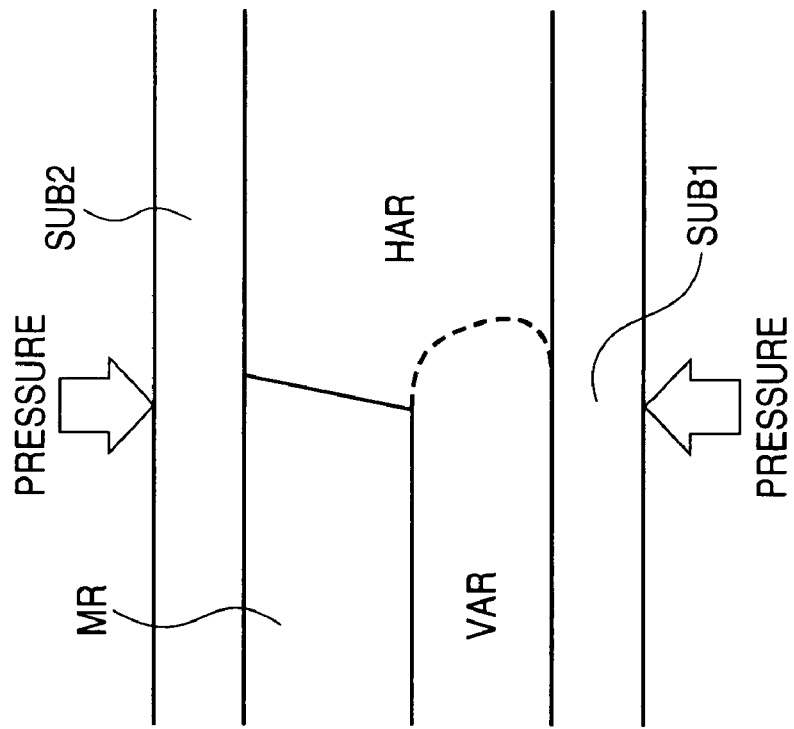
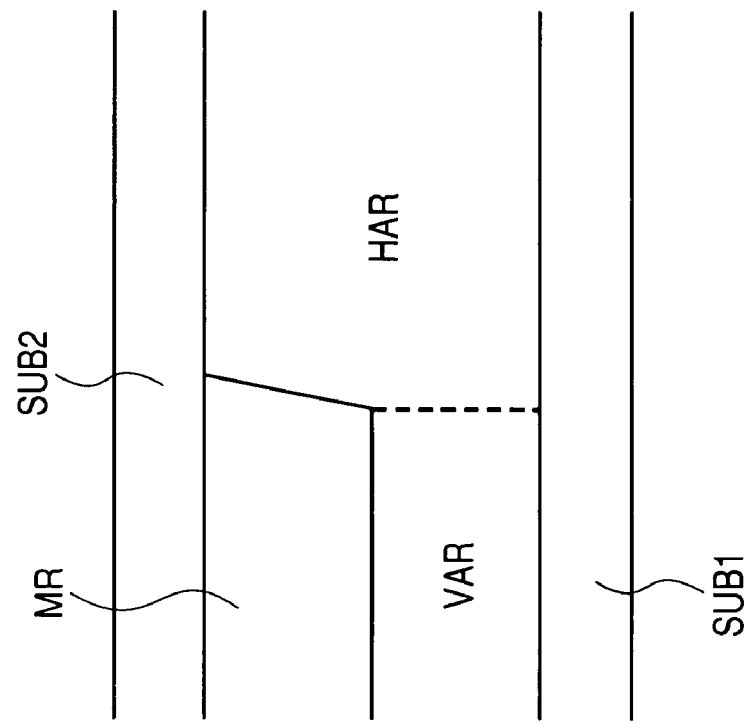

TRANSFLECTIVE LIQUID CRYSTAL DISPLAY DEVICE

CLAIM OF PRIORITY

The present application claims priority from Japanese Application JP 2006-294472 filed on Oct. 30, 2006, the content of which is hereby incorporated by reference into this application.

BACKGROUND OF THE INVENTION (1) Field of the Invention

The present invention relates to transflective liquid crystal display devices, and more particularly to a transflective liquid crystal display device that enables transmissive display at a wide viewing angle, and also enables an excellent visibility even under a very light environment such as outdoors.

(2) Description of the Related Art

A transflective liquid crystal display device having a transmissive portion and a reflective portion within one sub-pixel has been employed as a display for a mobile device.

On the other hand, a liquid crystal display device of the IPS system has been known as a liquid crystal display device. In the liquid crystal display device of the IPS system, pixel electrodes and a common electrode are formed on the same substrate, an electric field is applied between the pixel electrodes and the common electrode, and liquid crystal is rotated within a substrate plane to conduct light and dark control. For that reason, the liquid crystal display of the IPS system has a feature that the shading of a display image is not reversed when a screen is viewed from an angle.

To utilize the above feature, for example, Japanese Patent Application Laid-Open Publication No. 2006-171376 proposes that the transflective liquid crystal display device is constituted by using the liquid crystal display device of the IPS system.

SUMMARY OF THE INVENTION

In Japanese Patent Application Laid-Open Publication No. 2006-171376, in order to give a normally black display to a reflective display region, the thickness of a liquid crystal layer in the reflective display region is reduced to about half of a transmissive display region, and a ½ wavelength plate is disposed in only the reflective display region.

However, the liquid crystal display device of the IPS system suffers from such a problem that a voltage-luminance characteristic of the transmissive display region is different in a changing manner from a voltage-luminance characteristic of the reflective display region because a drive voltage is stepped up when the thickness of the liquid crystal layer is thinned.

In order to eliminate the above problem, in Japanese Patent Application Laid-Open Publication No. 2006-171376, the transmissive display region is driven by the IPS system, and the reflective display region is driven by the vertical electric field system in the transflective liquid crystal display device.

However, Japanese Patent Application Laid-Open Publication No. 2006-171376 merely discloses the basic concept that the transmissive display region is driven by the IPS system, and the reflective display region is driven by the vertical electric field system in the transflective liquid crystal display device. Japanese Patent Application Laid-Open Publication No. 2006-171376 does not disclose a specific configuration of the transflective liquid crystal display device in which the transmissive display region is driven by the IPS system, and the reflective display region is driven by the vertical electric field system.

That is, Japanese Patent Application Laid-Open Publication No. 2006-171376 fails to teach the transflective liquid crystal display device that enables transmissive display at a wide viewing angle, and also enables an excellent visibility even under a very light environment such as outdoors.

The present invention has been made to solve the above problems with the related art, and therefore an object of the present invention is to provide a transflective liquid crystal display device that enables transmissive display at a wide viewing angle, and also enables an excellent visibility even under a very light environment such as outdoors.

The above and other objects and novel features of the present invention will become apparent from the description of the present specification and the attached drawings.

The outline of the representative embodiment according to the present invention will be described below in brief.

(1) A transflective liquid crystal display device including a liquid crystal display panel having a first substrate, a second substrate, and a liquid crystal interposed between the first substrate and the second substrate in which the liquid crystal display panel includes a plurality of subpixels having a transmissive portion and a reflective portion, wherein the transmissive portion of each of the plurality of subpixels includes a first common electrode formed on the first substrate, and a transmissive pixel electrode formed on the first common electrode through an interlayer insulating film, wherein the transmissive pixel electrode has a plurality of pectinate electrodes or slits, and wherein the reflective portion of each of the plurality of subpixels includes a reflective electrode formed on the first common electrode, a planar reflective pixel electrode formed on the first common electrode through the interlayer insulating film, second common electrodes formed on the second substrate, and a retarder formed between the second common electrodes and the second substrate.

(2) In the configuration of the item (1), the transmissive pixel electrode includes a plurality of pectinate electrodes, each of the plurality of pectinate electrodes has an oblique portion at one end of the reflective pixel electrode side so that an interval between the oblique portion and the other pectinate electrode becomes gradually larger, and a leading end of the pectinate electrode at the opposite side of the reflective pixel electrode is hooked.

(3) In the configuration of the item (1), the reflective portion of each of the plurality of subpixels has a reflective pixel electrode having a plurality of pectinate electrodes or slits instead of the planar reflective pixel electrode.

(4) A transflective liquid crystal display device including a liquid crystal display panel having a first substrate, a second substrate, and a liquid crystal interposed between the first substrate and the second substrate in which the liquid crystal display panel includes a plurality of subpixels having a transmissive portion and a reflective portion, wherein the transmissive portion of each of the plurality of subpixels includes a transmissive pixel electrode having a plurality of pixel pectinate electrodes and a first common electrode having a plurality of common pectinate electrodes which are disposed between the respective pixel pectinate electrodes of the transmissive pixel electrode, and wherein the reflective portion of each of the plurality of subpixels includes a planar reflective pixel electrode formed at a position of the same layer as that of the transmissive pixel electrode, a reflective electrode formed on the planar reflective pixel electrode, second common electrodes formed on the second substrate, and a retarder formed between the second common electrodes and the second substrate.

(5) In the configuration of the item (4), the reflective portion of each of the plurality of subpixels has a reflective pixel electrode having a plurality of pectinate electrodes instead of the planar reflective pixel electrode.

(6) A transflective liquid crystal display device including a liquid crystal display panel having a first substrate, a second substrate, and a liquid crystal interposed between the first substrate and the second substrate in which the liquid crystal display panel includes a plurality of subpixels having a transmissive portion and a reflective portion, wherein the transmissive portion of each of the plurality of subpixels includes a transmissive pixel electrode formed on the first substrate and a first common electrode formed on the first substrate, wherein the reflective portion of each of the plurality of subpixels includes a planar reflective pixel electrode formed at a position of the same layer as that of the transmissive pixel electrode, a reflective electrode, and second common electrodes formed on the second substrate, wherein a step formation layer is formed between the second common electrodes and the second substrate, wherein the step formation layer has a tapered boundary portion between the transmissive portion and the reflective portion of each of the sub-pixels, and wherein the second common electrodes extend to a tapered bottom portion of the step formation layer, and each leading portion of the second common electrodes is positioned in the transmissive region of each of the subpixels.

(7) In the configuration of the item (1), the reflective portion of each of the subpixels is disposed in the center of each of the subpixels in a first direction orthogonal to a display line, and the transmissive portion of each of the subpixels is disposed at both sides of the reflective portion in the first direction.

(8) In the configuration of the item (1), the reflective electrode is formed of a metal layer having a high reflectivity.

(9) In the configuration of the item (1), the transmissive pixel electrode is integrated with the reflective pixel electrode, and a slit is formed between the transmissive pixel electrode and the reflective pixel electrode.

(10) In the configuration of the item (1), a video voltage is applied to the transmissive pixel electrode and the reflective pixel electrode, independently.

(11) In the configuration of the item (1), an orientation control slit is formed in the reflective pixel electrode.

(12) In the configuration of the item (1), an orientation control dielectric projection is formed on the reflective pixel electrode.

(13) In the configuration of the item (1), an orientation control slit is formed on the second common electrodes.

(14) In the configuration of the item (1), an orientation control dielectric projection is formed on the second common electrodes.

(15) In the configuration of the item (1), the first common electrode has an orientation control slit formed at a portion that comes in contact with at least one side of the reflective portion of each of the subpixels.

(16) In the configuration of the item (1), the reflective electrode is formed with an orientation control slit, and one reflective electrode on one display line is connected with the reflective electrode is connected to another reflective electrode that is adjacent to the one reflective electrode at portions where no orientation control slits of the reflective electrodes are formed.

(17) In the configuration of the item (1), the first common electrode is divided in each of the display lines.

(18) In the configuration of the item (17), a metal layer that forms the reflective electrode is formed on at least a part of the first common electrode.

(19) In the configuration of the item (1), the second common electrodes are integrally so formed as to cover the plurality of subpixels on the second substrate, and has an opening portion at a portion of each of the subpixels opposite to the transmissive portion.

(20) In the configuration of the item (1), the second common electrodes are of a laminate structure of a transparent electrode and a low resistant metal wiring.

The advantages that are obtained by the representative embodiments of the present invention will be described in brief below.

According to the present invention, there can be provided a transflective liquid crystal display device that enables transmissive display at a wide viewing angle, and also enables an excellent visibility even under a very light environment such as outdoors.

BRIEF DESCRIPTION OF THE DRAWINGS

These and other features, objects and advantages of the present invention will become more apparent from the following description when taken in conjunction with the accompanying drawings wherein:

FIG. 15E is a diagram showing the distribution of electric flux lines and a liquid crystal orientation state that is developed by the electric flux lines in the cross section structure along the section line F-F' of FIG. 15A in the case where the slit portion (SLP) is arranged;

FIGS. 21A and 21B are diagrams for explaining a problem with the transflective liquid crystal display device of the present invention.

DETAILED DESCRIPTION OF THE PREFERRED EMBODIMENTS

Hereinafter, a description will be given of embodiments of the present invention in detail with reference to the accompanying drawings. In all of the drawings for explaining the embodiments, parts having identical functions are denoted by the same symbols, and their duplex description will be omitted.

First Embodiment

Figure 1A:
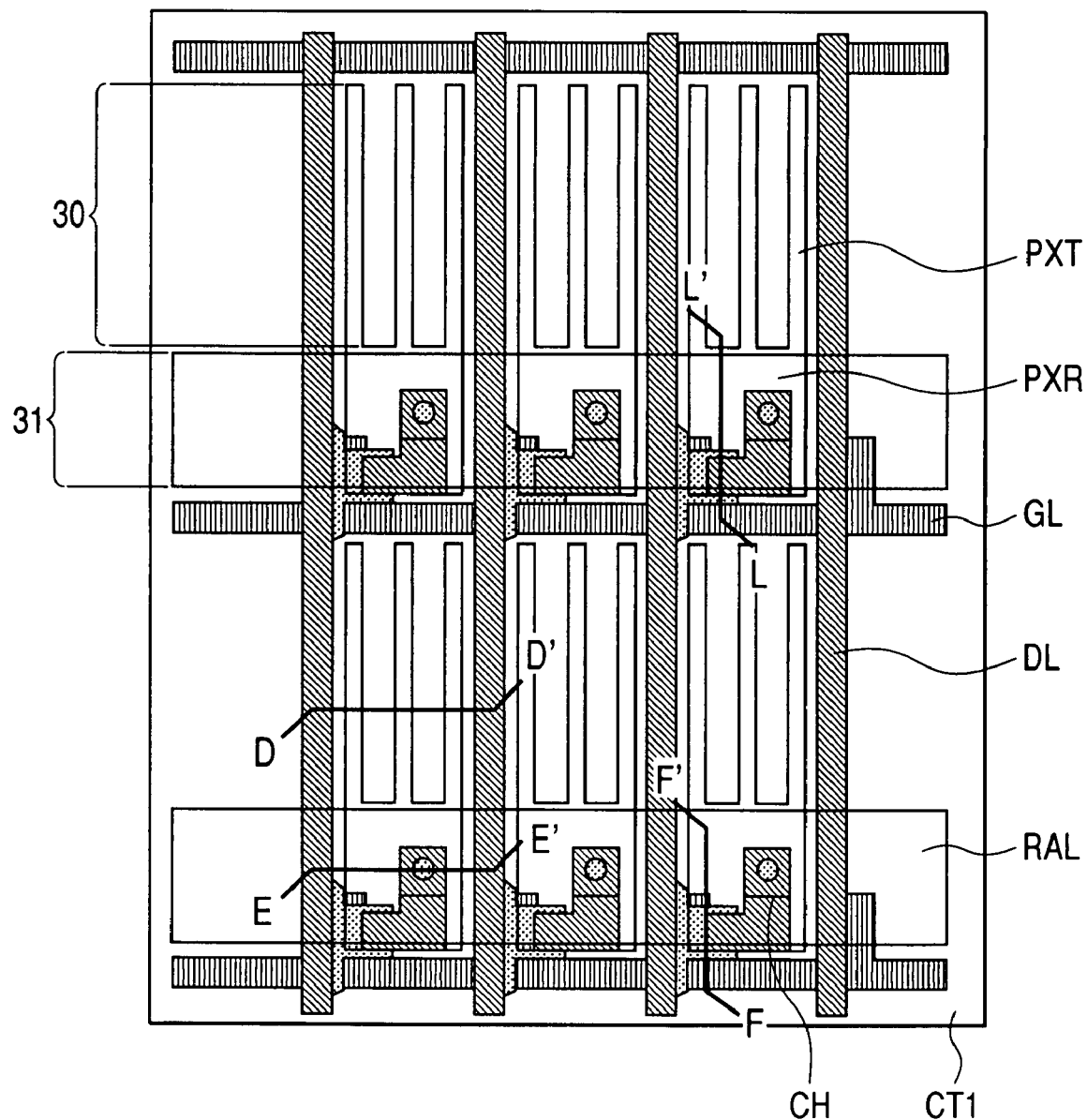
FIG. 1A is a plan view showing an electrode structure of a first substrate side in a transflective liquid crystal display device according to a first embodiment of the present invention.
Figure 1B:
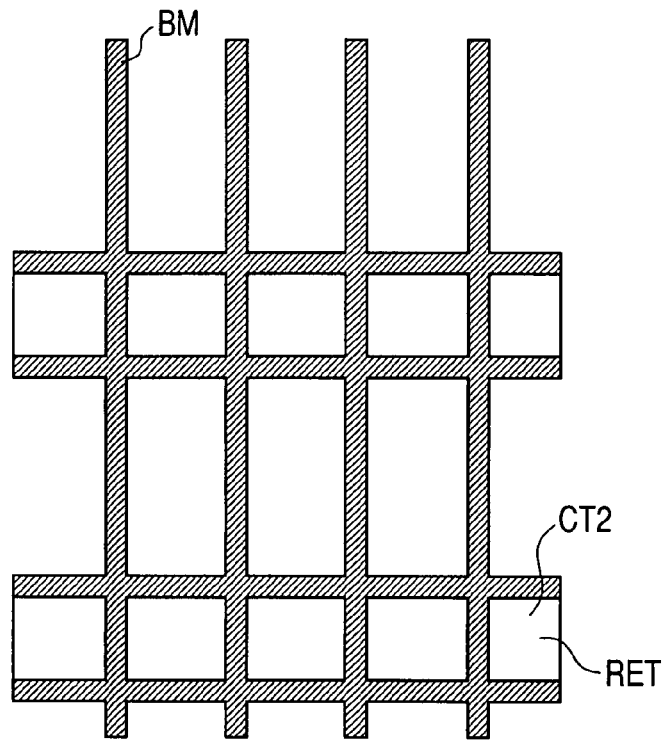
FIG. 1B is a plan view showing an electrode structure of a second substrate side in the transflective liquid crystal display device according to the first embodiment of the present invention.

FIG. 1A is a plan view showing an electrode structure of a first substrate side in a transflective liquid crystal display device according to a first embodiment of the present invention. FIG. 1B is a plan view showing an electrode structure of a second substrate side in the transflective liquid crystal display device according to the first embodiment of the present invention.

Figure 1C:
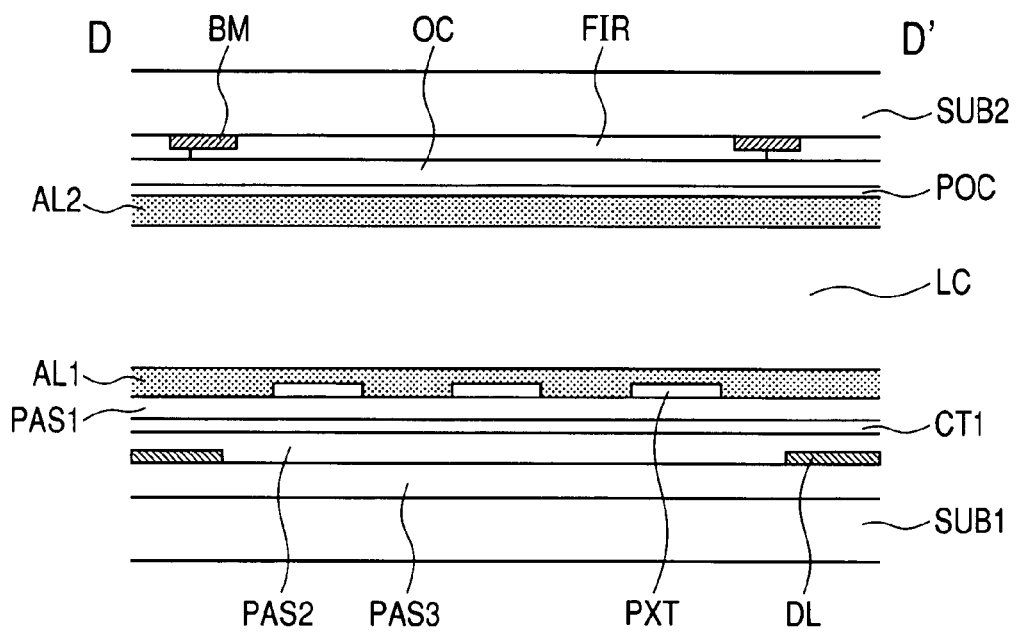
FIG. 1C is a cross-sectional view showing a cross section structure taken along a section line D-D' of FIG. 1A.
Figure 1D:
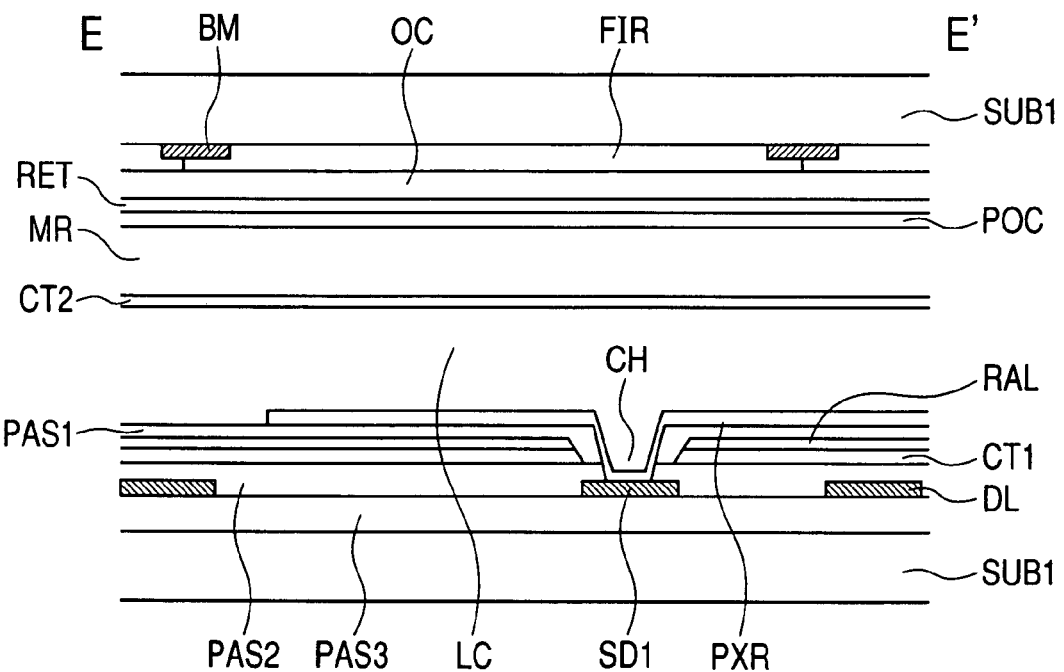
FIG. 1D is a cross-sectional view showing a cross section structure taken along a section line E-E' of FIG. 1A.
Figure 1E:
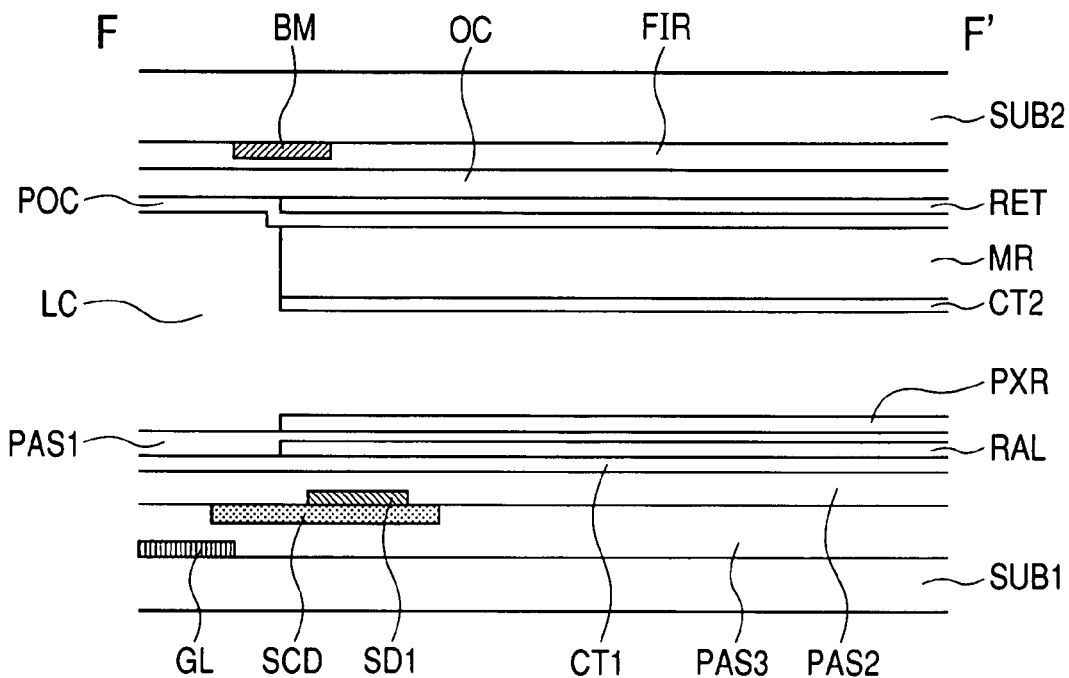
FIG. 1E is a cross-sectional view showing a cross section structure taken along a section line F-F' of FIG. 1A.

FIG. 1C is a cross-sectional view showing a cross section structure taken along a section line D-D' of FIG. 1A. FIG. 1D is a cross-sectional view showing a cross section structure taken along a section line E-E' of FIG. 1A. FIG. 1E is a cross-sectional view showing a cross section structure taken along a section line F-F' of FIG. 1A.

In the transflective liquid crystal display device according to this embodiment, a pair of first and second substrates (SUB1, SUB2) are so disposed as to interpose a liquid crystal layer (LC) therebetween. In the transflective liquid crystal display device according to this embodiment, a main front surface side of the second substrate (SUB2) is an observation side.

As shown in FIG. 1C, in this embodiment, oriented films (AL1, AL2) are formed on the surfaces of the substrates (SUB1, SUB2) at the liquid crystal layer side, but the oriented films (AL1, AL2) are omitted from the drawings other than FIG. 1C.

Hereinafter, a description will be given of the configuration of a reflective portion 31 of the transflective liquid crystal display device according to this embodiment.

As shown in FIGS. 1D and 1E, a black matrix (BM), a color filter layer (FIR) of red, green, and blue, an overcoat film (OC), a built-in retarder (½ wavelength plate) (RET) for changing a polarization state of light, a protective film (POC), a step formation layer (MR), second common electrodes (CT2; also called "opposed electrodes"), and an oriented film (AL2) are formed in the order toward the liquid crystal layer (LC) from the second substrate (SUB2) at the liquid crystal layer side of the second substrate (SUB2; also called "CF substrate") in reflective portions 31. A polarizer (not shown) is formed outside of the substrate (SUB2).

Also, scanning lines (GL: also called "gate lines"), an interlayer insulating layer (PAS3), video lines (DL: also called "source lines" or "drain lines"), source electrodes (SD1), an interlayer insulating film (PAS2), a first common electrode (CT1: also called "opposed electrode"), reflective electrodes (RAL), an interlayer insulating film (PAS1), reflective pixel electrodes (PXR), and an oriented film (AL1) are formed in the order of from the first substrate (SUB1) toward the liquid crystal layer (LC) at the liquid crystal layer side of the first substrate (SUB1; also called "TFT substrate"). A polarizer (not shown) is formed outside of the substrate (SUB1).

The first common electrode (CT1) is formed on the entire surface of the first substrate (SUB1) in a planar shape. Also, the reflective electrodes (RAL) are formed in a planar shape (or a rectangular shape) in correspondence with the reflective portions 31 of the respective subpixels on one display line.

The reflective pixel electrodes (PXR) and the first common electrode (CT1) are superimposed on each other through the interlayer insulating film (PAS1), to thereby form a retention volume. The first common electrode (CT1) and the second common electrodes (CT2) are formed of, for example, transparent conductive films such as ITO (indium tin oxide). Also, the interlayer insulating film (PAS1) is not limited to one layer but may be formed of two or more layers.

The reflective electrodes (RAL) can be formed of, for example, a metal film made of aluminum (Al) or a two-layer structure including a lower layer of molybdenum and an upper layer of aluminum (Al).

Likewise, as shown in FIG. 1B, the second common electrodes (CT2) are formed in a rectangular shape (or a planar shape) in correspondence with the reflective portions 31 of the respective subpixels on one display line.

In each of the reflective portions 31 of this embodiment, an electric field is applied between the reflective pixel electrodes (PXR) and the second common electrodes (CT2) to change the orientation of the liquid crystal layer (LC). That is, the reflective portions 31 of this embodiment is driven by a so-called vertical electric field system. In FIG. 1D, reference CH denotes a contact hole formed in the first common electrode (CT1). Also, in FIG. 1E, reference SCD denotes a semiconductor layer.

Hereinafter, a description will be given the configuration of a transmissive portion 30 in the transflective liquid crystal display device according to this embodiment.

As shown in FIGS. 1C and 1E, the configuration of the first substrate (SUB1) side in the transmissive portion 30 is different from the configuration of the second substrate (SUB2) at the reflective portion 31 in that the step formation layer (MR) and the second common electrodes are omitted. Other configurations are identical with each other.

Also, the configuration of the first substrate (SUB1) side in the transmissive portion 30 is different from the configuration of the first substrate (SUB1) in the reflective portion 31 in that the reflective pixel electrodes (PXR) are formed in the planar shape (or the rectangular shape) whereas the transmissive pixel electrodes (PXT) are formed by pectinate electrodes each having a plurality of pectinate electrodes. Other configurations are identical with each other. Each of the transmissive pixel electrodes (PXT) can be formed by a slit-shaped electrode having a plurality of slits instead of the pectinate electrodes each having a plurality of pectinate electrodes.

In the transmissive portion 30 of this embodiment, the transmissive pixel electrodes (PXT) and the planar first common electrode (CT1) are laminated on each other through the interlayer insulating film (PAS1). Arch-like electric flux lines that are formed between the transmissive pixel electrode (PXT) and the first common electrode (CT1) are so distributed as to penetrate the liquid crystal layer (LC) to change the orientation of the liquid crystal layer (LC). That is, the transmissive portion 30 of this embodiment is driven by a so-called IPS system.

Also, the transmissive portion 30 displays the light and dark of a light by the aid of the birefringence of the liquid crystal layer (LC) whereas the reflective portion 31 displays the light and dark of a light by the aid of the birefringence of the built-in retarder (½ wavelength plate) and the liquid crystal layer (LC) which are disposed within the liquid crystal display panel.

In this embodiment, the built-in retarder (RET) is disposed in only the reflective portion 31, thereby making it possible to provide a structure in which the performance of the normal transmissive IPS display system can be exercised as it is, without having an unnecessary retarder.

Also, the thickness of the liquid crystal layer (LC) of the reflective portion 31 is set to about half of the thickness of the liquid crystal layer (LC) of the transmissive portion 30. In the case of the IPS system, when only the thickness of the liquid crystal layer (LC) is narrowed without changing the intervals between the pixel electrodes and the common electrodes or the widths or intervals between the pectinate or slit-shaped electrodes, the driving voltage is stepped up. This is because an orientation restraining force is exerted on liquid crystal molecules between the first substrate (SUB1) and the second substrate (SUB2), and an influence of the orientation restraining force becomes more remarkable when the thickness of the liquid crystal layer (LC) is thinned.

On the other hand, in the case where the second common electrodes (CT2) are disposed between the built-in retarder (RET) and the liquid crystal layer (LC) which are disposed in the reflective portion 31 to drive the liquid crystal layer (LC) due to the vertical electric field that is developed between the second common electrodes (CT2) and the pixel electrodes on the second substrate (SUB2), the influence of the orientation restraining force becomes remarkable when the thickness of the liquid crystal layer (LC) is thinned as in the IPS system.

However, on the other hand, the distances between the second common electrodes (CT2) on the second substrate (SUB2) and the pixel electrodes on the first substrate (SUB1) are also reduced, the vertical electric field rigidity is inevitably strengthened. As a result, the driving voltage is hardly stepped up, since the both are nearly cancelled.

Accordingly, the transmissive portion 30 is of the IPS system, and the reflective portion 31 is of the vertical electric field system where the vertical electric field is developed between the second common electrodes (CT2) and the reflective pixel electrodes (PXR) on the first substrate (SUB1) as in this embodiment, to thereby enable both of the transmissive IPS display at a wide viewing angle and the reflective display with high reflectivity.

As described above, according to this embodiment, the IPS system having the wide viewing angle is used for the transmissive portion 30, and the vertical electric field system is applied to the reflective portion 31 that requires the light reflective display that is important for ensuring the outdoor visibility, thereby making it possible to realize the liquid crystal display device that is excellent in the visibility under the dark environment such as a dark room and under the very light environment such as outdoors.

In this embodiment, the initial orientation direction (rubbing direction) of the liquid crystal layer (LC) is shifted by 5 to 20° with respect to the longitudinal direction of the respective pectinate electrodes of the transmissive pixel electrode (PXT). The retardation of the liquid crystal layer (LC) adjusts the thickness and refractive index anisotropy (Δn) of the liquid crystal layer (LC) so that the transmissive portion 30 has about ½ wavelength and the reflective portion 31 has about ¼ wavelength.

In addition, in this embodiment or respective embodiments that will be described later, it is desirable that a concavo-convex pattern (PTO) is arranged in the reflective portion 31 as shown in FIGS. 18 to 19 which will be described later.

In this embodiment, the built-in retarder (RET) is arranged in such a manner that the polarizers disposed on both sides of the liquid crystal display panel are designed in the same manner as that in the transmissive liquid crystal display device of the IPS system, and a phase difference between the reflective portion 31 and the transmissive portion 30 is shifted by ¼ wavelength.

More specifically, a laminated body of the liquid crystal layer (LC) and the built-in retarder (RET) is disposed in ¼ wavelength plate of the wide band. That is, the retardation of the liquid crystal layer (LC) that is closer to the reflective electrode (RAL) is set to ¼ wavelength and the other retardation is set to ½ wavelength.

In the IPS system, at the time of applying a voltage, the liquid crystal layer (LC) mainly changes the orientation so that the director orientation mainly rotates within the layer, a change in the tilt angle is small, and the retardation hardly changes. For that reason, the reflective the liquid crystal layer (LC) is so arranged as to be closer to the reflective electrode (RAL) than the built-in retarder (RET), and the retardation is set to ¼ wavelength.

The delay phase axis of the built-in retarder (RET) is determined as follows. The azimuth is defined by counterclockwise with the upper polarizer transmission axis as 0 degree.

When the delay phase axis or azimuth of the built-in retarder (RET) is θPH, and the azimuth of the orientation angle of the liquid crystal layer (LC) is θLC, the azimuth in the case of the ¼ wavelength plate of the wide band is represented by the following expression (1).

$$2\theta PH = \pm 45° \pm \theta LC \quad (1)$$

In this example, θLC must be set to any one of 0° and ±90° since the polarizer is arranged in the transmissive portion 30 in the same manner as that in the transmissive liquid crystal display device of the IPS system. As a result, θPH becomes ±22.5° (equal to or higher than 20° and equal to or lower than 25° with a margin ±10% of manufacturing) or ±67.5° (equal to or higher than 60° and equal to or lower than 75° with a margin ±10% of manufacturing).

As described above, the laminated body of the liquid crystal layer (LC) and the built-in retarder (RET) is arranged in the ¼ wavelength plate of the wide band, to thereby obtain a reflective display that reduces the reflectivity over the entire visible wavelength, and is low in the reflectivity and achromatic.

The transmissive portion 30 and the reflective portion 31 are different from each other in the optimum value of the retardation of the liquid crystal layer (LC) for setting the reflectivity and the transmissivity to limit values that are determined by the light absorption of the polarizer. The reflective portion 31 has ¼ wavelength, and the transmissive portion 30 has ½ wavelength.

In order to realize the above, the thickness of the liquid crystal layer (LC) of the reflective portion 31 must be set to be smaller than that of the transmissive portion 30. More specifically, the step formation layer (MR) is disposed in the reflective portion 31, and the thickness of the liquid crystal layer (LC) in the reflective portion 31 is reduced by the thickness of the step adjustment layer (MR). It is needless to say the step adjustment layer (MR) must be so disposed as to correspond to the reflective portion 31.

In this embodiment, the built-in retarder (RET) is used, and the built-in retarder (RET) is also so disposed as to correspond to the reflective portion 31.

A difference in the retardation which is required by the reflective portion 31 and the transmissive portion 30 is ¼ wavelength, and the retardation that is required by the built-in retarder (RET) is ½ wavelength. For that reason, when the birefringence of the built-in retarder (RET) is twice or more as large as that of the liquid crystal layer (LC), the thickness of the built-in retarder (RET) is smaller than the difference in the thickness of the liquid crystal layer (LC) which is required by the reflective portion 31 and the transmissive portion 30.

In this case, the built-in retarder (RET) and the step adjustment layer (MR) are laminated on each other, and then patterned in correspondence with the reflective portion 31 so as to set a total of the thicknesses of the built-in retarder (RET) and the step adjustment layer (MR) to the difference in the thickness of the liquid crystal layer (LC) which is required by the reflective portion 31 and the transmissive portion 30.

Alternatively, when the birefringence of the built-in retarder (RET) is twice as large as the liquid crystal layer (LC), the thickness of the built-in retarder (RET) is equal to the difference in the thickness of the liquid crystal layer (LC) which is required by the reflective portion 31 and the transmissive portion 30. In this case, since no step adjustment layer (MR) is required, a manufacturing process can be simplified.

Alternatively, in the case where an attempt is made so that the built-in retarder (RET) and the liquid crystal layer (LC) come out of contact with each other, a protective film (POC) can be disposed between the built-in retarder (RET) and the liquid crystal layer (LC). In the case of providing the protective film (POC), since a step that is caused by the built-in retarder (RET) is reduced, it is necessary to add a structure for controlling the thickness of the liquid crystal layer (LC) of the reflective portion 31.

Second Embodiment

Figure 2A:
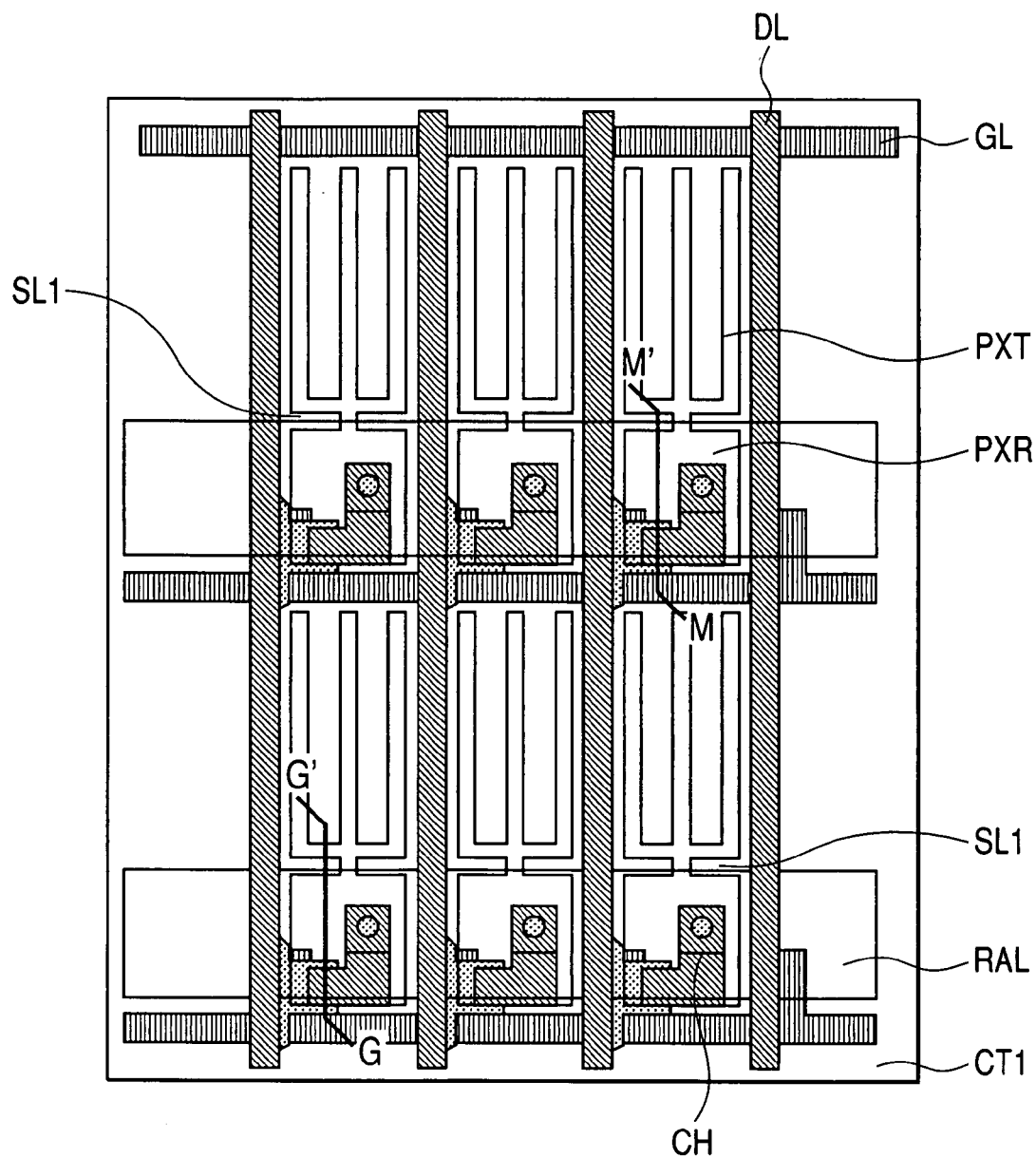
FIG. 2A is a plan view showing an electrode structure of a first substrate side in a transflective liquid crystal display device according to a second embodiment of the present invention.
Figure 2B:
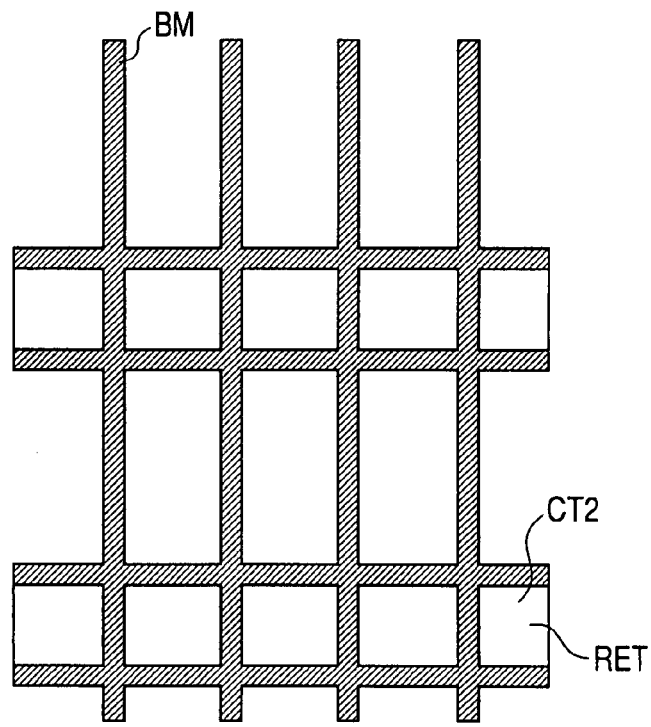
FIG. 2B is a plan view showing an electrode structure of a second substrate side in the transflective liquid crystal display device according to the second embodiment of the present invention.

FIG. 2A is a plan view showing an electrode structure of a first substrate side in a transflective liquid crystal display device according to a second embodiment of the present invention. FIG. 2B is a plan view showing an electrode structure of a second substrate side in the transflective liquid crystal display device according to the second embodiment of the present invention.

Figure 2C:
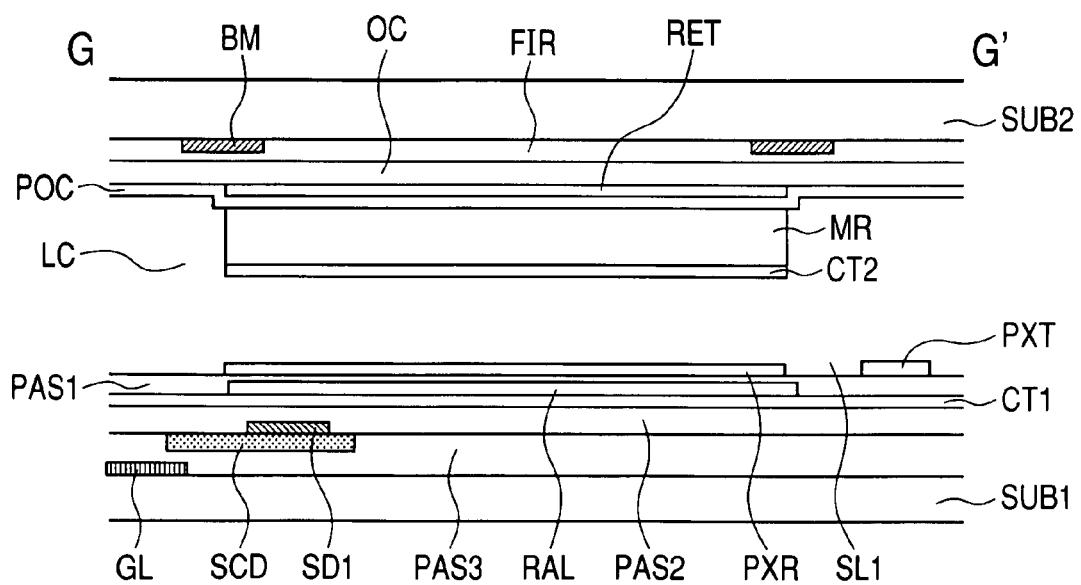
FIG. 2C is a cross-sectional view showing a cross section structure taken along a section line G-G' of FIG. 2A.

FIG. 2C is a cross-sectional view showing a cross section structure taken along a section line G-G' of FIG. 2A.

This embodiment shows a structure in which a slit (SL1) is defined between the transmissive pixel electrode (PXT) and the reflective pixel electrode (PXR) (that is, between the transmissive portion 30 and the reflective portion 31).

In this embodiment, an oblique electric field is forcedly developed toward the second common electrode (CT2) of a top of the step in the protective portion 31 from the reflective pixel electrode (PXR) inside of the reflective portion 31. As a result, the advantage that the orientation stability is enhanced is obtained.

In the case where the electric field is applied perpendicularly to the first and second substrate plane, a direction along which liquid crystal molecules rises up by a direction of a pretilt angle which is developed in the vicinity of the first and second substrates is usually determined.

However, in the case where the pretilted angle is small, the liquid crystal molecules rise up at an opposite side of the direction along which the pretilted angle is generated conventionally, due to some influence (for example, an oblique electric field that is developed by a contact hole (CH) or a leak electric field from adjacent subpixel). As a result, the orientation is disturbed.

In order to prevent the orientation disturbance that has been developed in the reflective portion 31 from affecting the transmissive portion 30, the above-mentioned slit (SL1) is arranged.

Figure 3A:
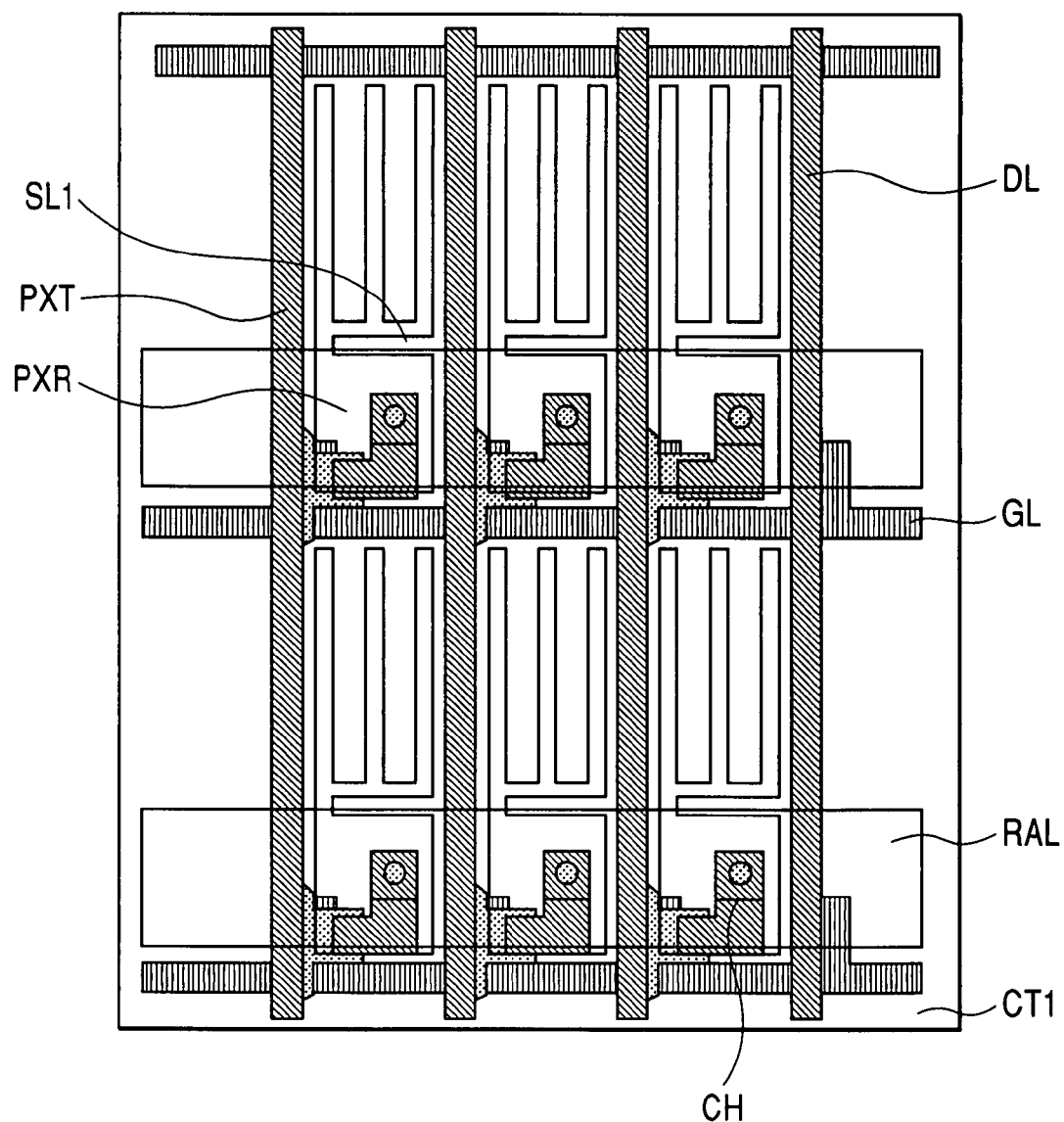
FIG. 3A is a plan view showing an electrode structure of a first substrate side in a transflective liquid crystal display device according to a modified example of the second embodiment of the present invention.
Figure 3B:
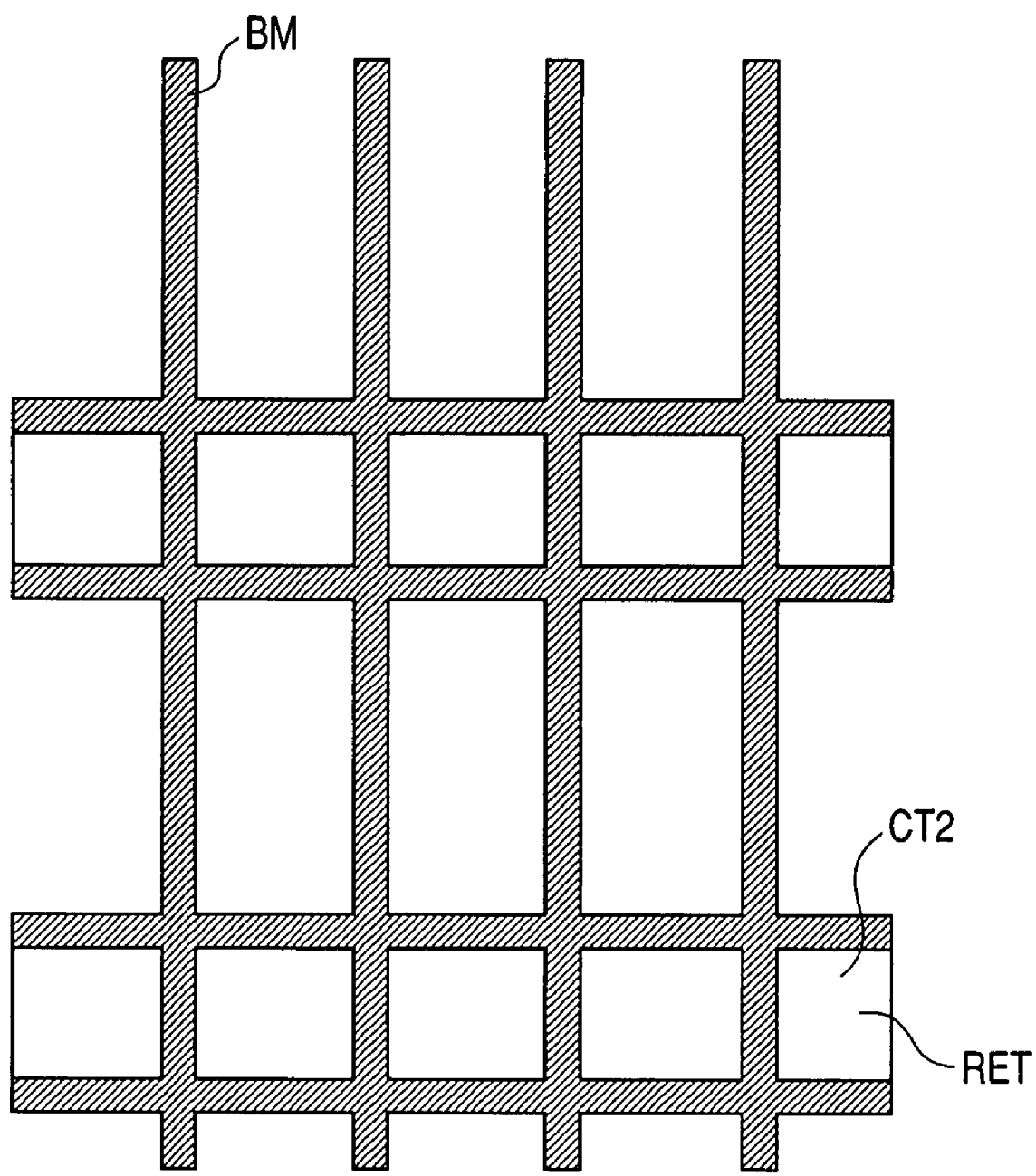
FIG. 3B is a plan view showing an electrode structure of a second substrate side in the transflective liquid crystal display device according to the modified example of the second embodiment of the present invention.

The reflective pixel electrodes (PXR) of the reflective portion 31 and the transmissive pixel electrodes (PXT) of the transmissive portion 30 are disposed in the same layer and fabricated integrally with each other. For that reason, it is necessary to connect the transmissive pixel electrodes (PXT) of the transmissive portion 30 to the reflective pixel electrodes (PXR) of the reflective portion 31. However, the connection portions are arbitrary, and for example, can be in the vicinity of the center thereof as shown in FIGS. 2A to 2C or at the end thereof as shown in FIGS. 3A and 3B. FIG. 3A is a plan view showing an electrode structure of a first substrate side in a transflective liquid crystal display device according to a modified example of the second embodiment of the present invention. FIG. 3B is a plan view showing an electrode structure of a second substrate side in the transflective liquid crystal display device according to the modified example of the second embodiment of the present invention.

Third Embodiment

Figure 4A:
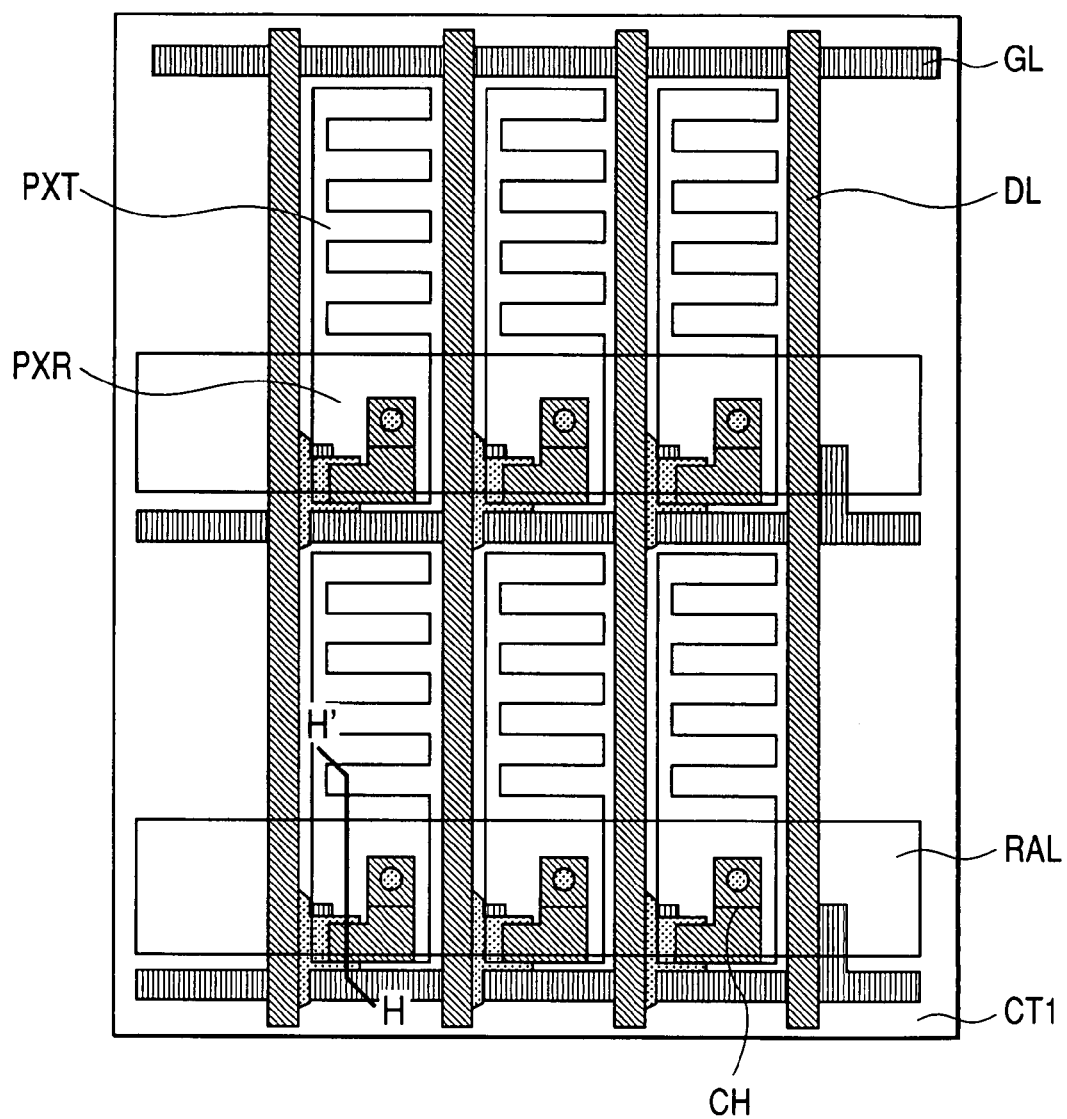
FIG. 4A is a plan view showing an electrode structure of a first substrate side in a transflective liquid crystal display device according to a third embodiment of the present invention.
Figure 4B:
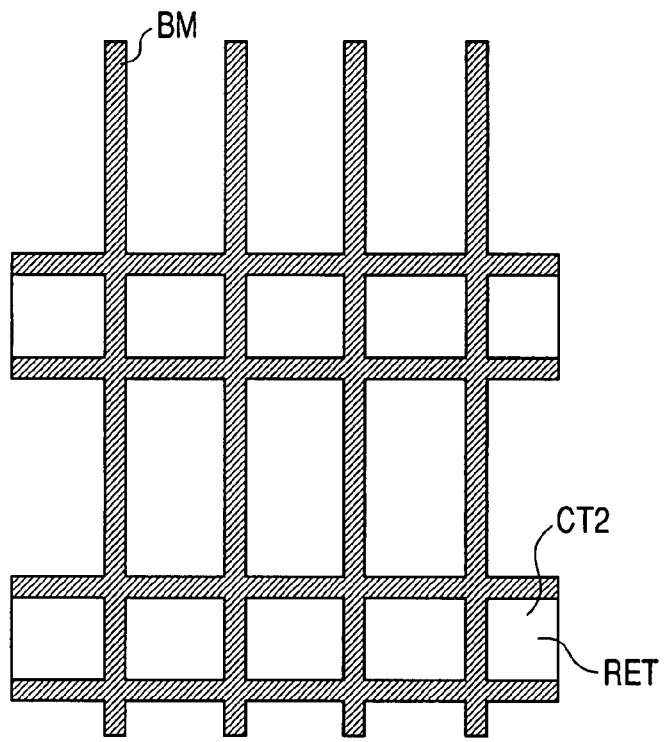
FIG. 4B is a plan view showing an electrode structure of a second substrate side in the transflective liquid crystal display device according to the third embodiment of the present invention.

FIG. 4A is a plan view showing an electrode structure of a first substrate side in a transflective liquid crystal display device according to a third embodiment of the present invention. FIG. 4B is a plan view showing an electrode structure of a second substrate side in the transflective liquid crystal display device according to the third embodiment of the present invention.

Figure 4C:
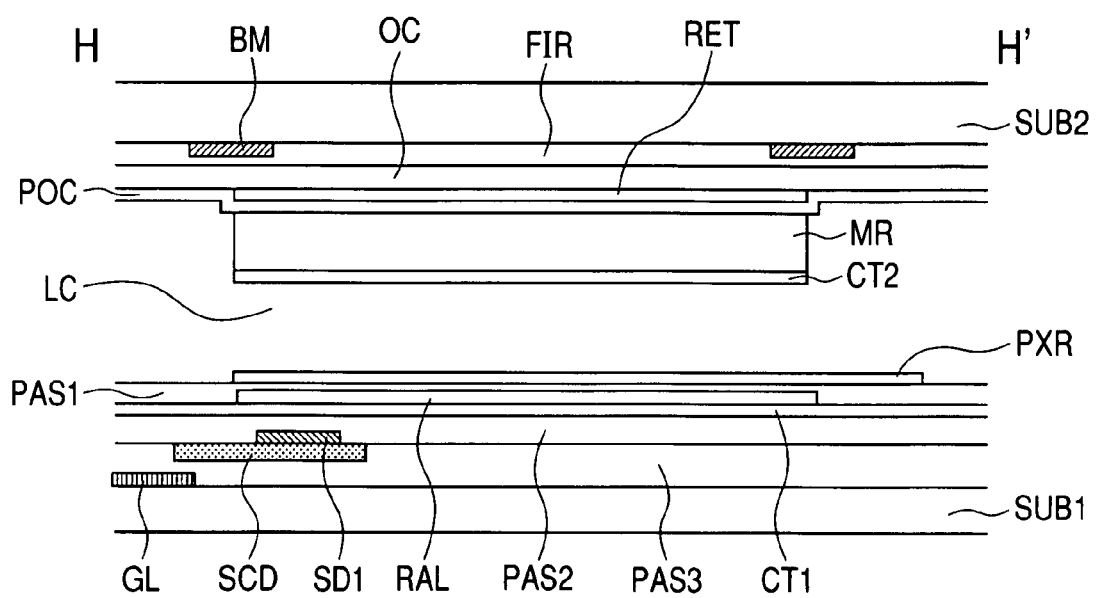
FIG. 4C is a cross-sectional view showing a cross section structure taken along a section line H-H' of FIG. 4A.

FIG. 4C is a cross-sectional view showing a cross section structure taken along a section line H-H' of FIG. 4A.

In the above respective embodiments, the direction of the pectinate electrodes of the transmissive pixel electrodes (PXT) in the transmissive portion 30 is disposed in parallel to the video lines (DL). On the other hand, in this embodiment, the direction of the pectinate electrodes of the transmissive pixel electrodes (PXT) is disposed in parallel to the scanning lines (GL).

The electrode structure of this embodiment is capable of obtaining the same advantages as those of the slit (SL1) in the above second embodiment. In FIGS. 4A to 4C, the connecting portions that connect the respective pectinate electrodes of the transmissive pixel electrodes (PXT) are formed at the ends of the video lines (DL) side. Alternatively, the connecting portions can be disposed in the center of the pectinate electrodes.

Fourth Embodiment

Figure 5A:
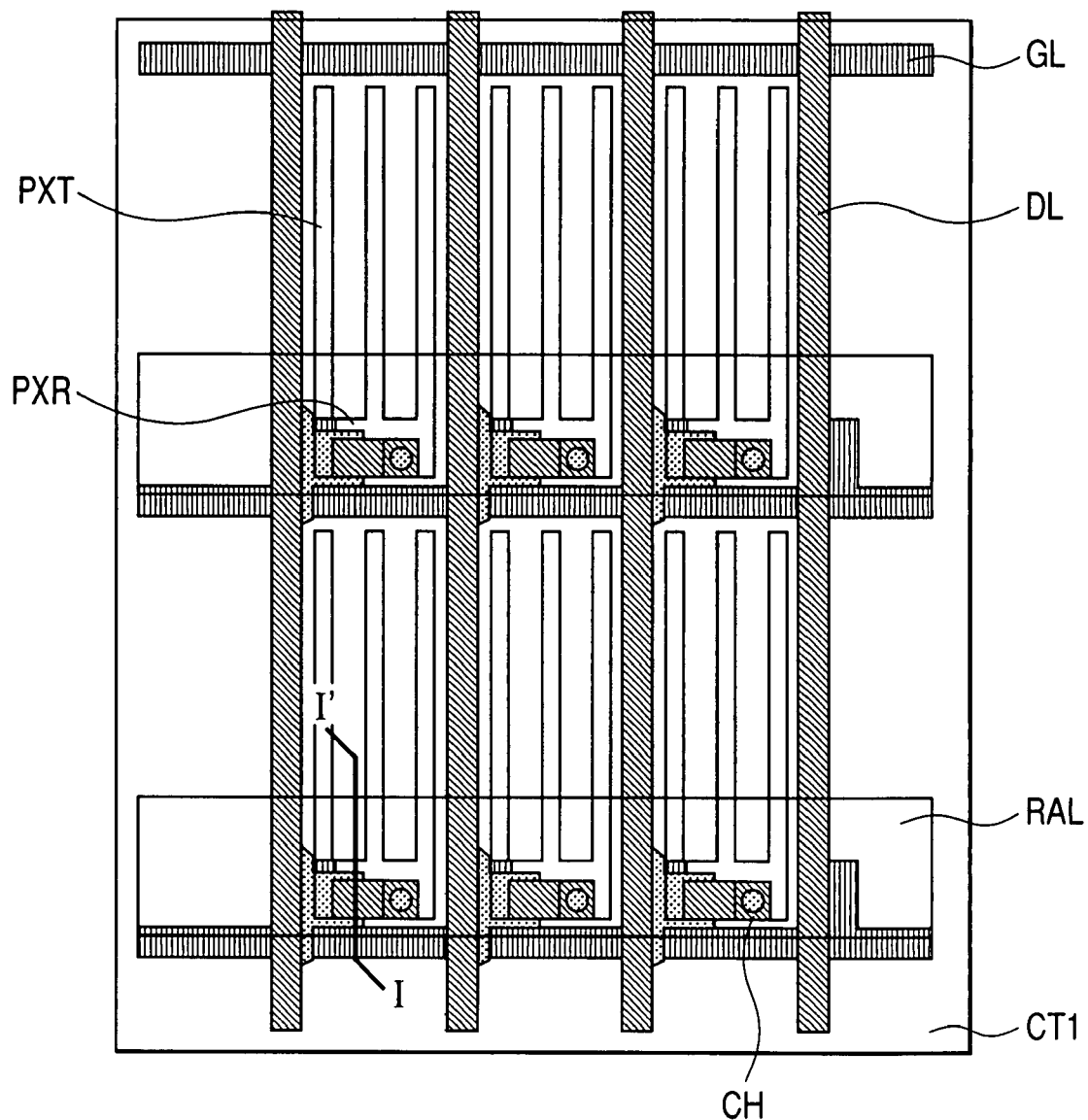
FIG. 5A is a plan view showing an electrode structure of a first substrate side in a transflective liquid crystal display device according to a fourth embodiment of the present invention.
Figure 5B:
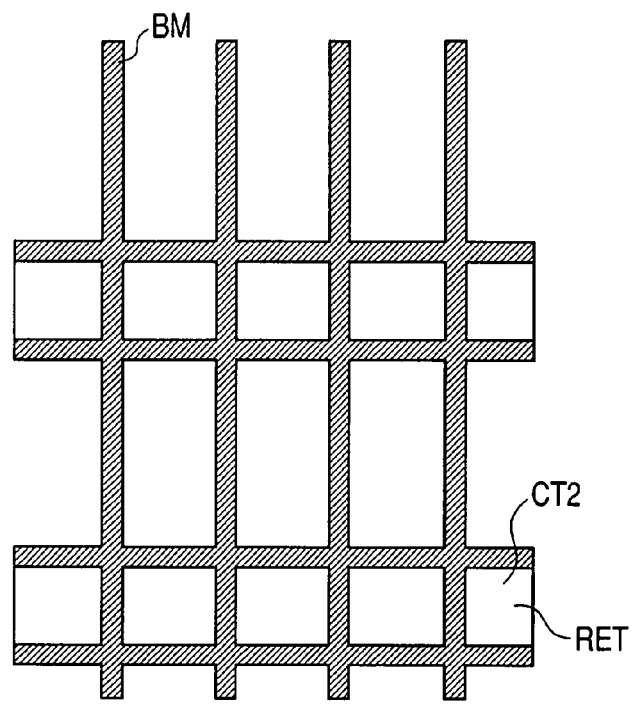
FIG. 5B is a plan view showing an electrode structure of a second substrate side in the transflective liquid crystal display device according to the fourth embodiment of the present invention.

FIG. 5A is a plan view showing an electrode structure of a first substrate side in a transflective liquid crystal display device according to a fourth embodiment of the present invention. FIG. 5B is a plan view showing an electrode structure of a second substrate side in the transflective liquid crystal display device according to the fourth embodiment of the present invention.

Figure 5C:
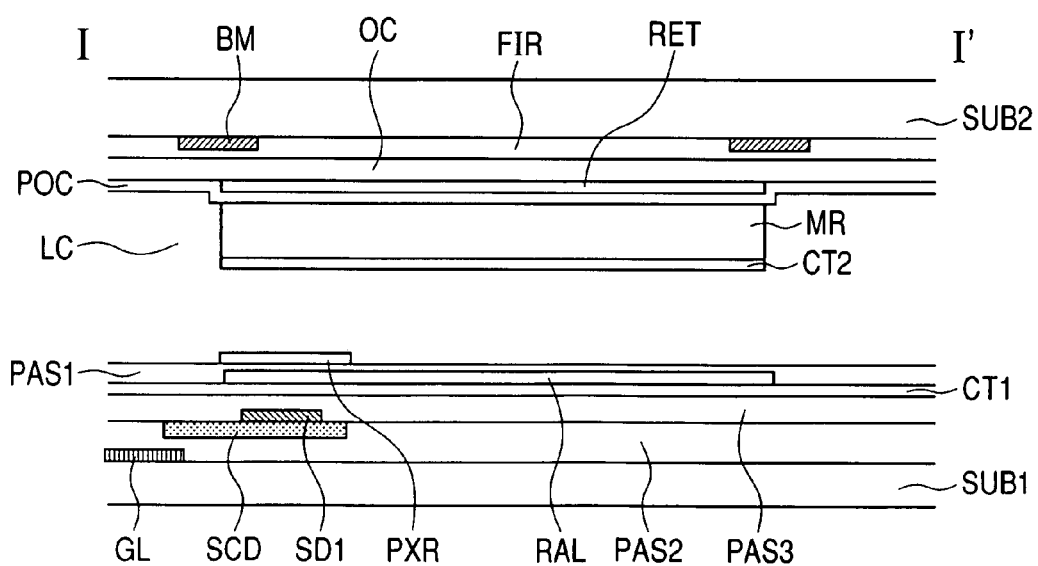
FIG. 5C is a cross-sectional view showing a cross section structure taken along a section line I-I' of FIG. 5A.

FIG. 5C is a cross-sectional view showing a cross section structure taken along a section line I-I' of FIG. 5A.

In the above respective embodiments, the pectinate electrodes are formed in only the transmissive portion 30. On the other hand, in this embodiment, the respective pectinate electrodes of the transmissive pixel electrodes (PXT) in the transmissive portion 30 extend up to the reflective portion 31.

The case in which the transmissive portion 30 is driven by the IPS system, and the reflective portion 31 is driven by the vertical electric field system is not preferable because when an end of the reflective portion 31 at the transmissive portion side and an end of the transmissive portion 30 at the reflective portion side are positionally deviated from design values, the orientation is disturbed in the transmissive portion 30 and the reflective portion 31.

Under the circumstances, the reflective pixel electrodes (PXR) of the reflective portion 31 are similarly constituted by the plural pectinate electrodes, thereby making it possible to improve the positional deviation margin of both of the first substrate (SUB1) and the second substrate (SUB2) in sealing the first substrate (SUB1) and the second substrate (SUB2).

Fifth Embodiment

Figure 6A:
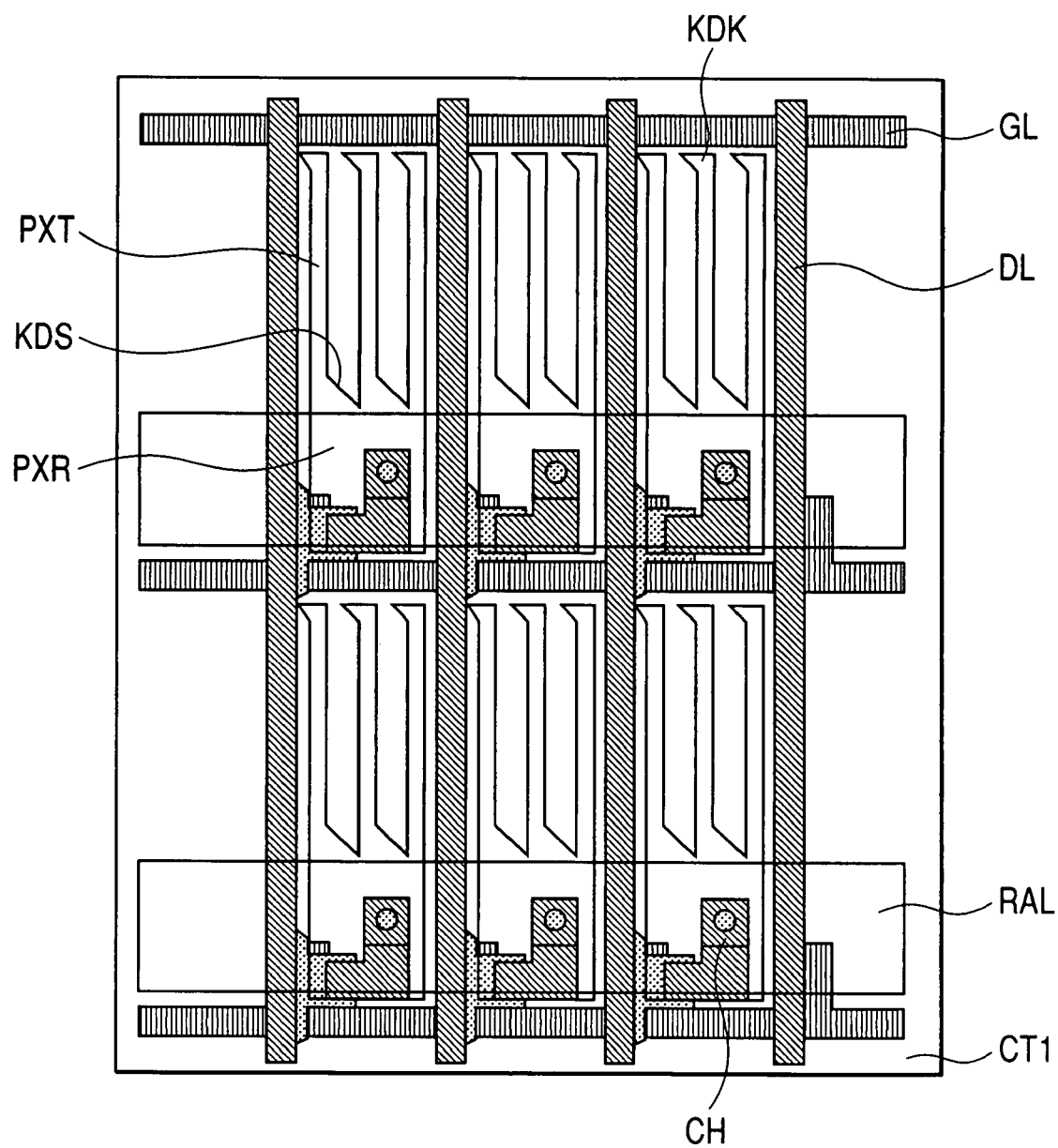
FIG. 6A is a plan view showing an electrode structure of a first substrate side in a transflective liquid crystal display device according to a fifth embodiment of the present invention.
Figure 6B:
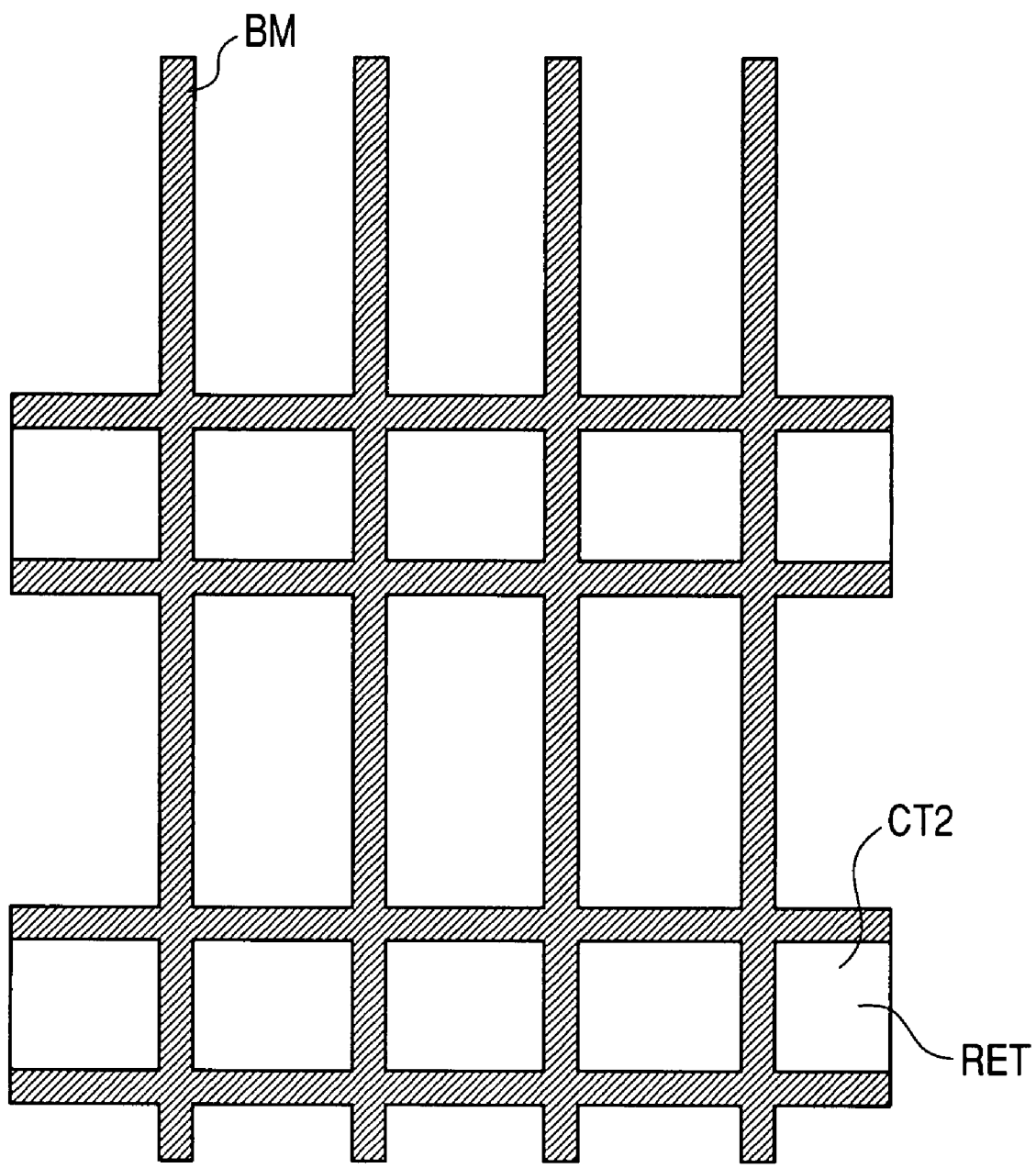
FIG. 6B is a plan view showing an electrode structure of a second substrate side in the transflective liquid crystal display device according to the fifth embodiment of the present invention.

FIG. 6A is a plan view showing an electrode structure of a first substrate side in a transflective liquid crystal display device according to a fifth embodiment of the present invention. FIG. 6B is a plan view showing an electrode structure of a second substrate side in the transflective liquid crystal display device according to the fifth embodiment of the present invention.

In this embodiment, an oblique side portion (KDS) that is so formed as to gradually increase an interval to another pectinate electrode is disposed on the reflective portion side of each pectinate electrode of the transmissive pixel electrodes (PXT) in the transmissive portion 30. Also, a leading portion (KDK) of each pectinate electrode of the transmissive pixel electrodes (PXT) at an opposite side of the reflective pixel electrodes (PXR) is hooked.

In the case where the transmissive portion 30 is driven by the IPS system, and the reflective portion 31 is driven by the vertical electric field system, there arises the following problem. That is, a lateral electric field or a fringe electric field which is developed by each pectinate electrode of the transmissive pixel electrodes (PXT) is different in the direction from a lateral electric field or a fringe electric field which is developed in the vicinity of the center of the transmissive portion in the vicinity of a boundary of the transmissive portion 30 with the reflective portion 31.

Under the above circumstances, in this embodiment, in order to solve the above problem, the oblique side portion (KDS) is disposed on the transmissive pixel electrodes (PXT) of the transmissive portion 30, and the leading portion (KDK) of each pectinate electrode of the transmissive pixel electrodes (PXT) at the opposite side of the reflective pixel electrodes (PXR) is hooked.

Sixth Embodiment

Figure 7A:
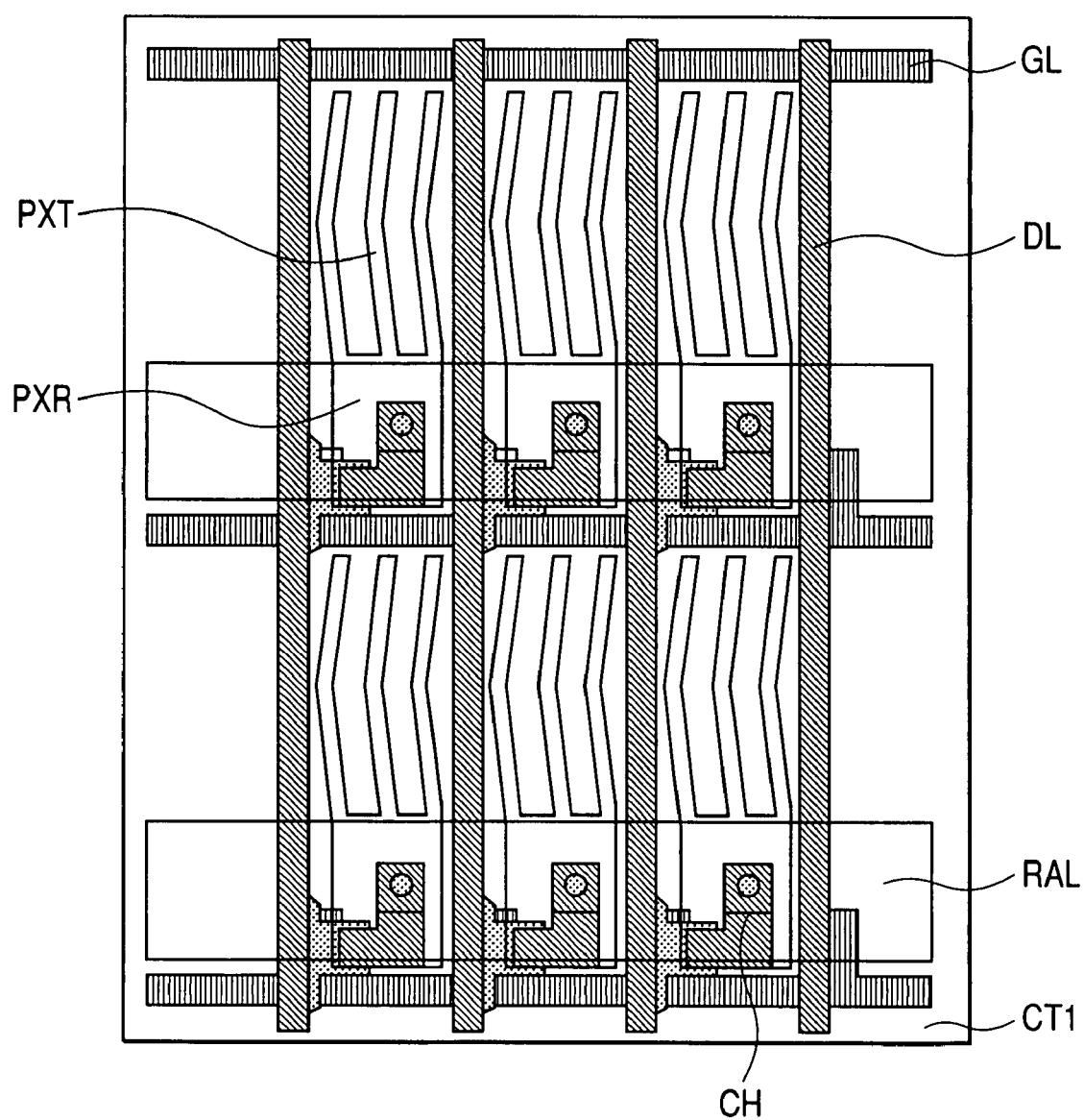
FIG. 7A is a plan view showing an electrode structure of a first substrate side in a transflective liquid crystal display device according to a sixth embodiment of the present invention.
Figure 7B:
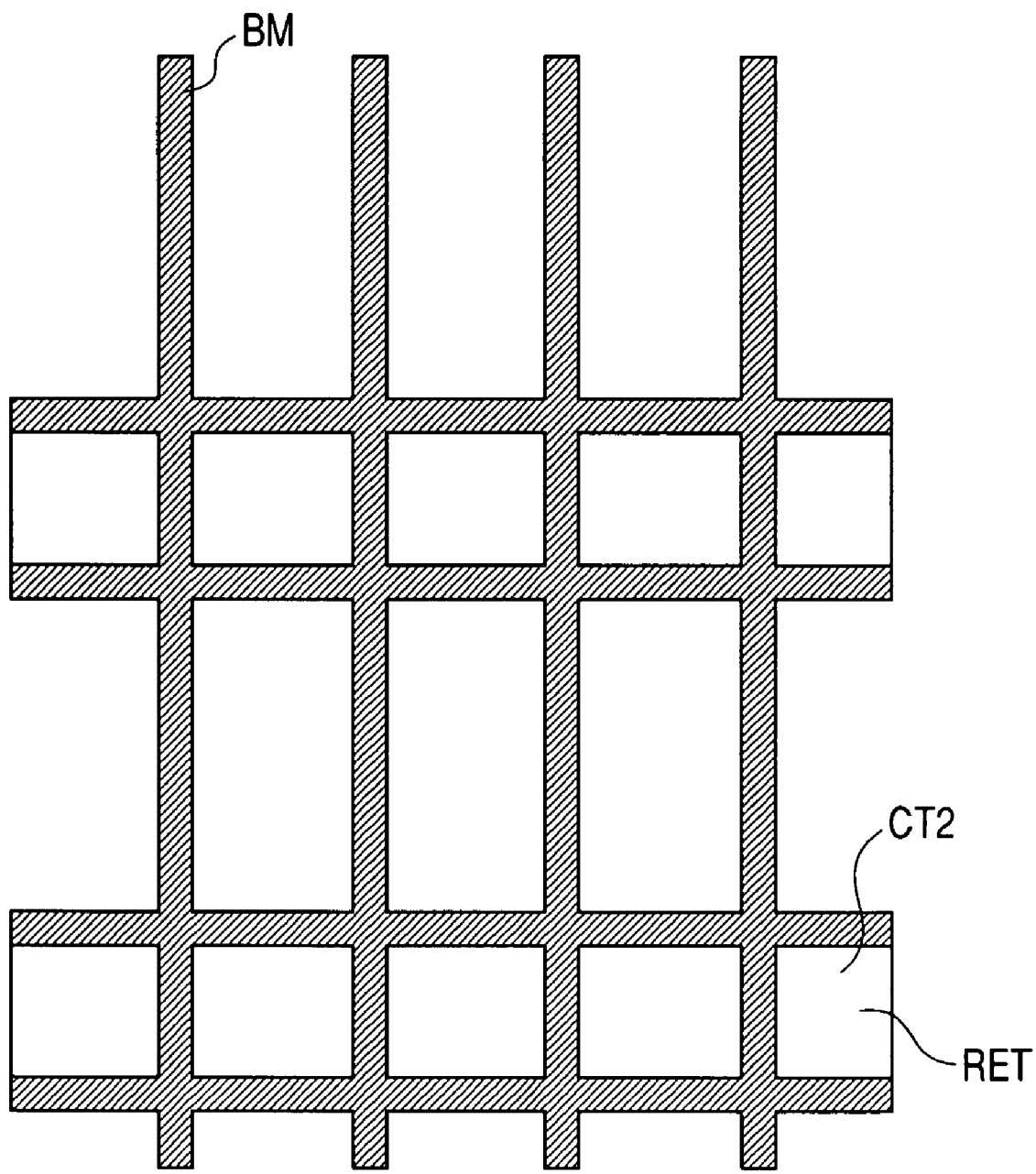
FIG. 7B is a plan view showing an electrode structure of a second substrate side in the transflective liquid crystal display device according to the sixth embodiment of the present invention.

FIG. 7A is a plan view showing an electrode structure of a first substrate side in a transflective liquid crystal display device according to a sixth embodiment of the present invention. FIG. 7B is a plan view showing an electrode structure of a second substrate side in the transflective liquid crystal display device according to the sixth embodiment of the present invention.

In this embodiment, each pectinate electrode that constitutes the pixel electrode (PXT) in the transmissive portion 30 is doglegged. With the above configuration, when a voltage is applied to each of the pectinate electrodes of the pixel electrodes (PXT), the liquid crystal orientation of the transmissive portion 30 is put into multiple domains. Hence, it is possible to improve the viewing angle characteristic of the transmissive portion 30.

Figure 8A:
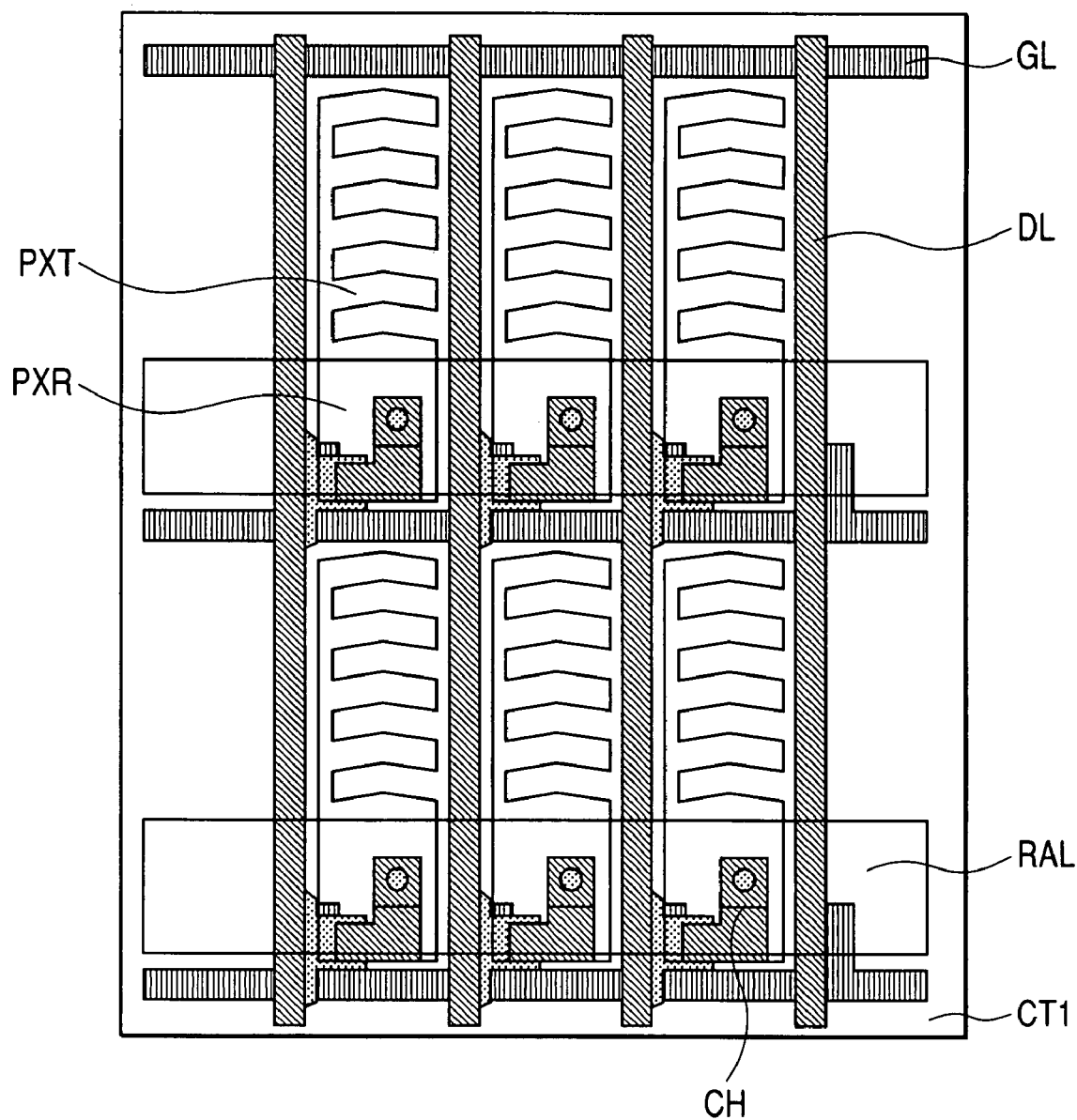
FIG. 8A is a plan view showing an electrode structure of a first substrate side in a transflective liquid crystal display device according to a modified example of the sixth embodiment of the present invention.
Figure 8B:
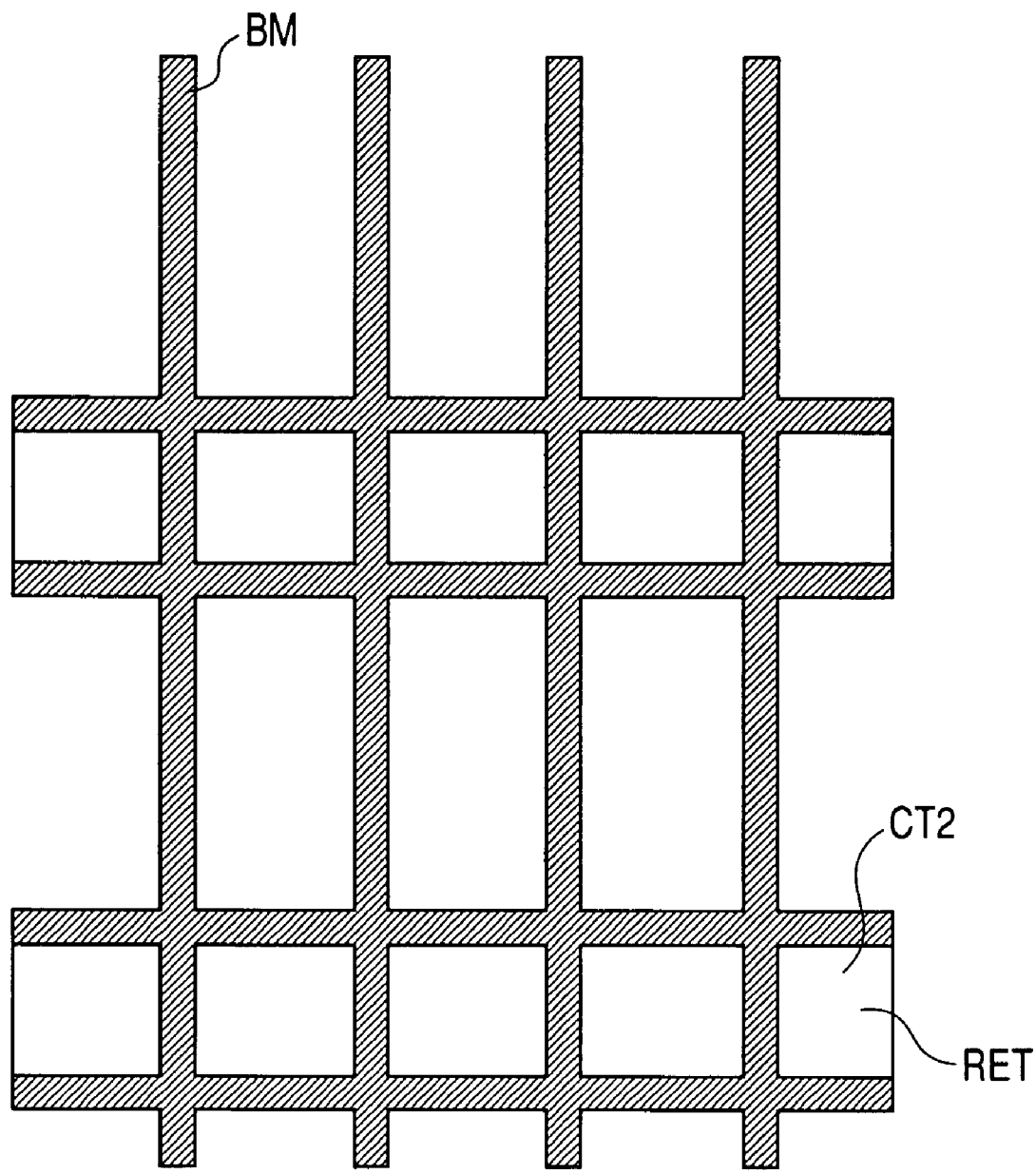
FIG. 8B is a plan view showing an electrode structure of a second substrate side in the transflective liquid crystal display device according to the modified example of the sixth embodiment of the present invention.

Each of the pectinate electrodes which constitute the pixel electrode (PXT) of the transmissive portion 30 can be configured as shown in FIGS. 8A and 8B.

FIG. 8A is a plan view showing an electrode structure of a first substrate side in a transflective liquid crystal display device according to a modified example of the sixth embodiment of the present invention. FIG. 8B is a plan view showing an electrode structure of a second substrate side in the transflective liquid crystal display device according to the modified example of the sixth embodiment of the present invention.

Seventh Embodiment

Figure 9A:
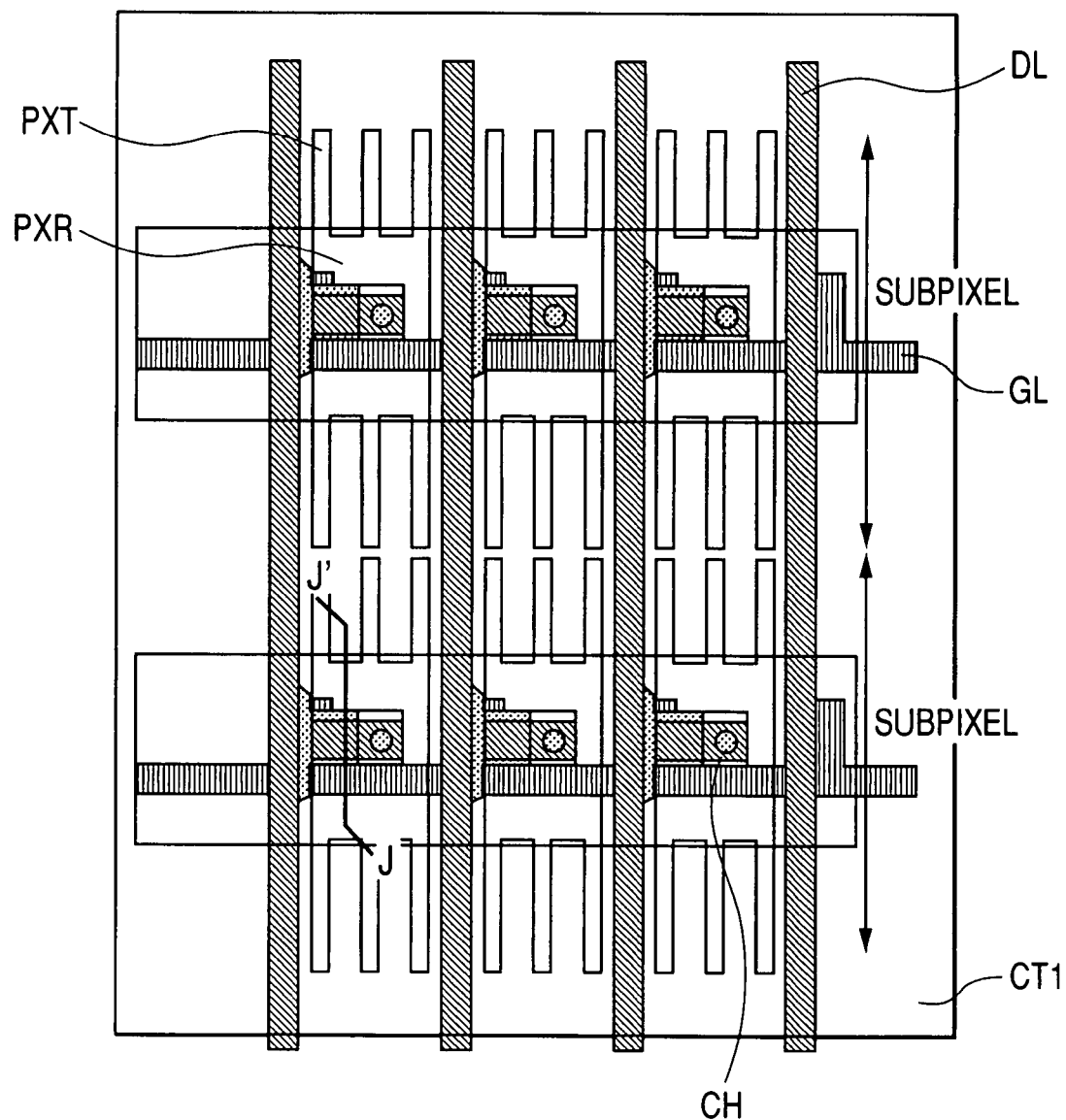
FIG. 9A is a plan view showing an electrode structure of a first substrate side in a transflective liquid crystal display device according to a seventh embodiment of the present invention.
Figure 9B:
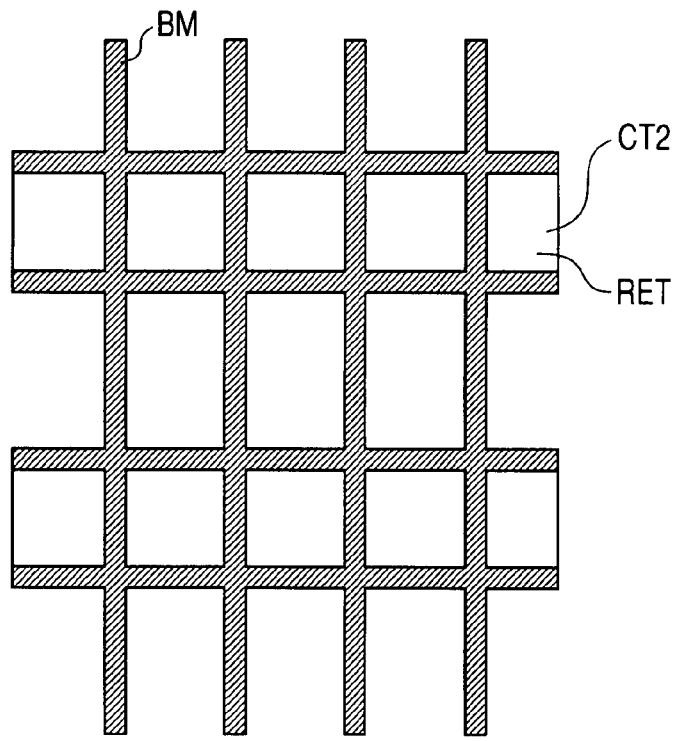
FIG. 9B is a plan view showing an electrode structure of a second substrate side in the transflective liquid crystal display device according to the seventh embodiment of the present invention.

FIG. 9A is a plan view showing an electrode structure of a first substrate side in a transflective liquid crystal display device according to a seventh embodiment of the present invention. FIG. 9B is a plan view showing an electrode structure of a second substrate side in the transflective liquid crystal display device according to the seventh embodiment of the present invention.

Figure 9C:
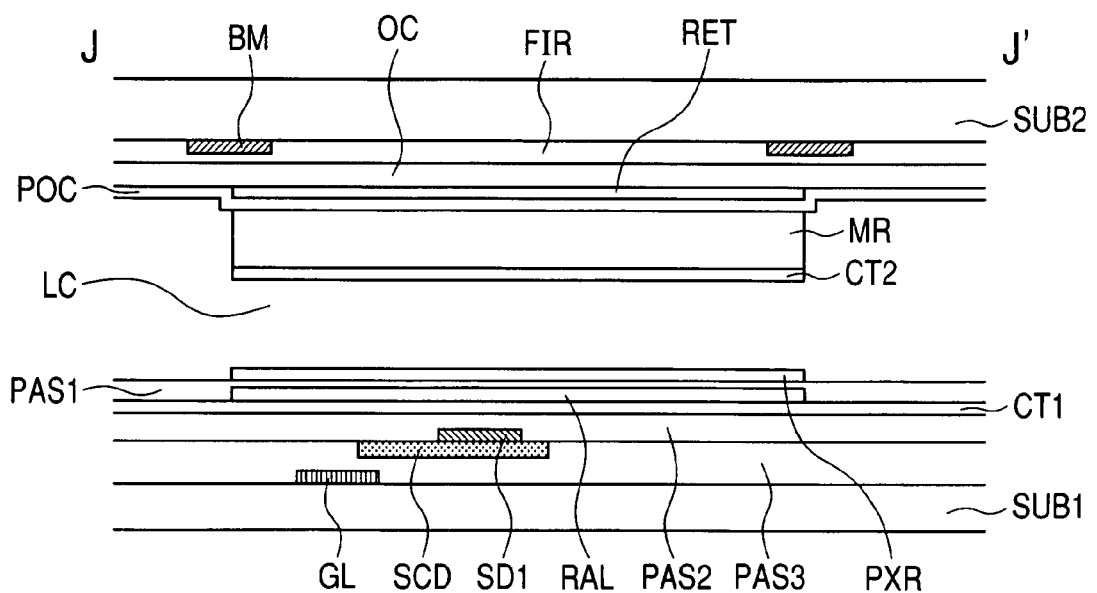
FIG. 9C is a cross-sectional view showing a cross section structure taken along a section line J-J' of FIG. 9A.

FIG. 9C is a cross-sectional view showing a cross section structure taken along a section line J-J' of FIG. 9A.

In this embodiment, the reflective portion 31 is disposed in the center of each of the subpixels. In the above respective embodiments, the transmissive portions 30 and the reflective portions 31 of the respective subpixels are disposed in the stated order of the transmissive portion 30, the reflective portion 31, the transmissive portion 30, the reflective portion 31, . . . in the scanning direction. On the other hand, in this embodiment, the transmissive portions 30 and the reflective portions 31 are disposed in the stated order of the transmissive portion 30, the reflective portion 31, the transmissive portion 30, the transmissive portion 30, the reflective portion 31, the transmissive portion 30. As a result, it is possible to reduce the orientation disturbance that is developed between the subpixels.

Eighth Embodiment

Figure 10A:
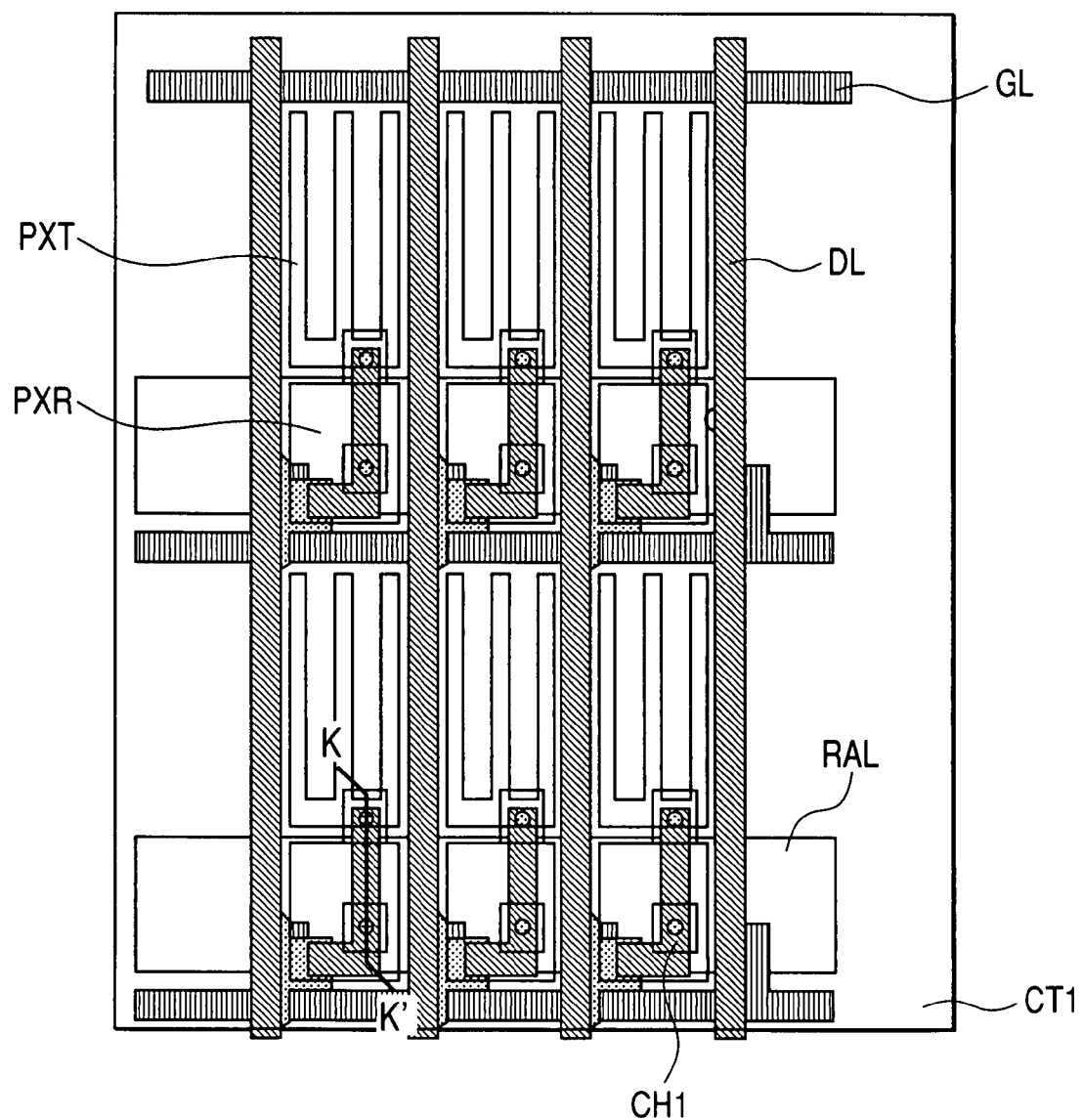
FIG. 10A is a plan view showing an electrode structure of a first substrate side in a transflective liquid crystal display device according to an eighth embodiment of the present invention.
Figure 10B:
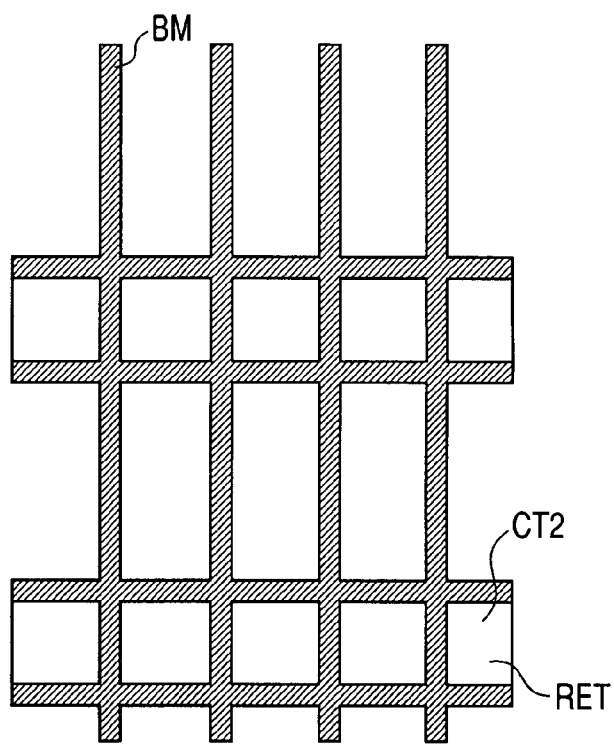
FIG. 10B is a plan view showing an electrode structure of a second substrate side in the transflective liquid crystal display device according to the eighth embodiment of the present invention.

FIG. 10A is a plan view showing an electrode structure of a first substrate side in a transflective liquid crystal display device according to an eighth embodiment of the present invention. FIG. 10B is a plan view showing an electrode structure of a second substrate side in the transflective liquid crystal display device according to the eighth embodiment of the present invention.

Figure 10C:
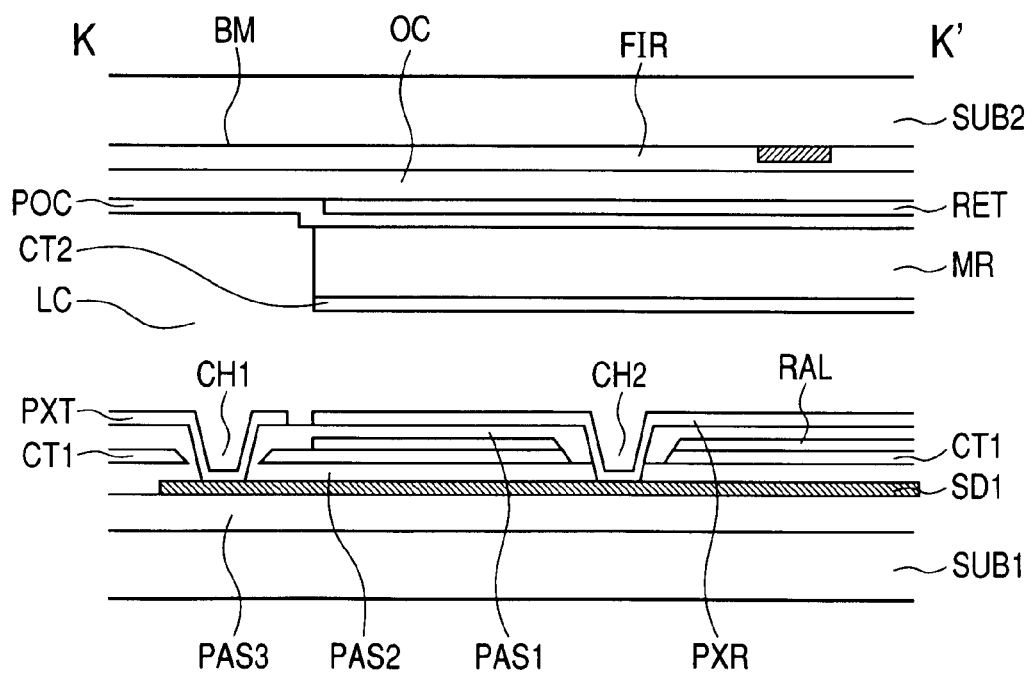
FIG. 10C is a cross-sectional view showing a cross section structure taken along a section line K-K' of FIG. 10A.

FIG. 10C is a cross-sectional view showing a cross section structure taken along a section line K-K' of FIG. 10A.

In this embodiment, the reflective pixel electrode (PXR) in the reflective portion 31 and the transmissive pixel electrode (PXT) in the transmissive portion 30 are disposed, independently. For that reason, contact holed are disposed in the transmissive portion 30 and the reflective portion 31, respectively, as indicated by CH1 and CH2 in FIG. 10C.

As a result, complete slits can be defined in the transmissive portion 30 and the reflective portion 31, thereby providing the effect of suppressing the orientation disturbance that is developed in the above reflective portion 31 from affecting the transmissive portion 31.

Ninth Embodiment

In this embodiment, it is necessary that a positional relationship between the reflective pixel electrode (PXR) of the reflective portion 31 and the second common electrode (CT2) of the reflective portion 31 is so designed as to prevent the orientation disturbance from being generated in the reflective portion 31.

An electric field is developed in an oblique direction in relation to the position of the top of the step formation layer (MR) or the slit between the transmissive pixel electrode (PXT) and the reflective pixel electrode (PXR). Because the pretilt is sufficiently small to the degree that the does not affect the viewing angle of the transmissive portion 30, liquid crystal is oriented in the direction of the oblique electric field.

For that reason, when the liquid crystal is so designed as to face the direction of the oblique electric field within the subpixel, the orientation disturbance is developed. The orientation disturbance has no problem if there is no motion at a certain position.

As a method of preventing the motion at a certain position, there is a method of providing an orientation control projection or providing an orientation control slit at the electrode of the reflective portion 31.

Figure 11A:
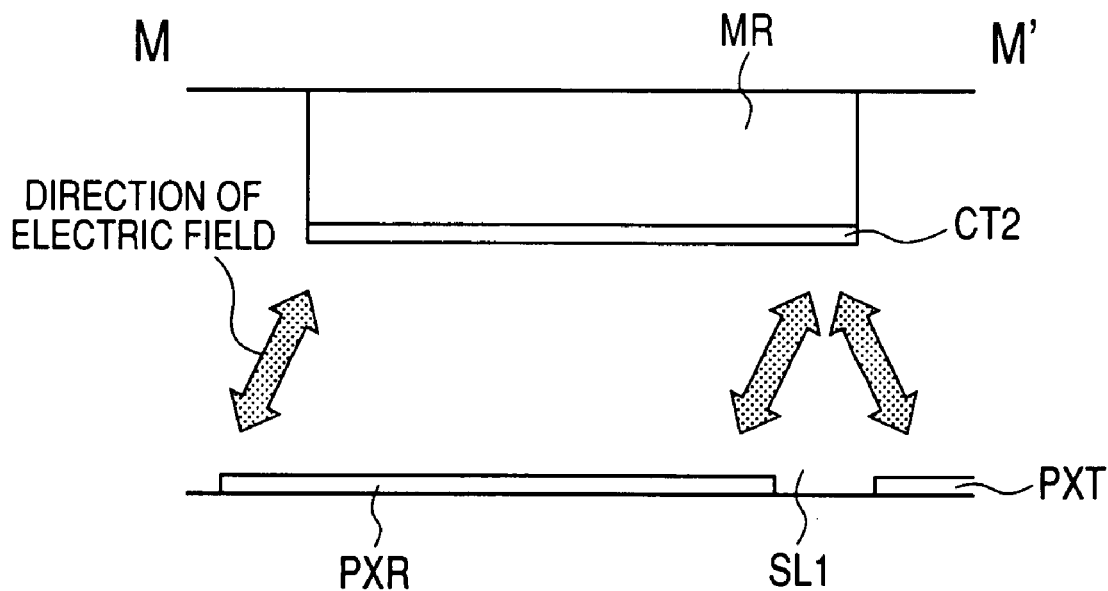
FIG. 11A is a cross-sectional view showing a cross section structure of a transflective liquid crystal display device according to a ninth embodiment of the present invention, which corresponds to the cross section structure along the section line M-M' of FIG. 2A.

FIG. 11A is a cross-sectional view showing a cross section structure of a transflective liquid crystal display device according to a ninth embodiment of the present invention, which corresponds to the cross section structure along the section line M-M' of FIG. 2A.

A slit is always disposed between the subpixels, and the direction of the oblique electric field which is developed in the reflective portion 31 is different according to the position of the slit and the position of the top of the step formation layer (MR).

In the case where the slits between the subpixels are disposed outside of the step formation layer (MR), the oblique electric field is developed as shown in FIG. 11A. In this situation, the slit (SL1) between the transmissive pixel electrode (PXT) of the transmissive portion 30 and the reflective pixel electrode (PXR) of the reflective portion 31 is disposed at the reflective portion side with respect to the top of the step formation layer (MR) as shown in FIG. 11A, to thereby make the direction of the developed electric field uniform within the reflective portion. As a result, no orientation disturbance is generated.

Figure 11B:
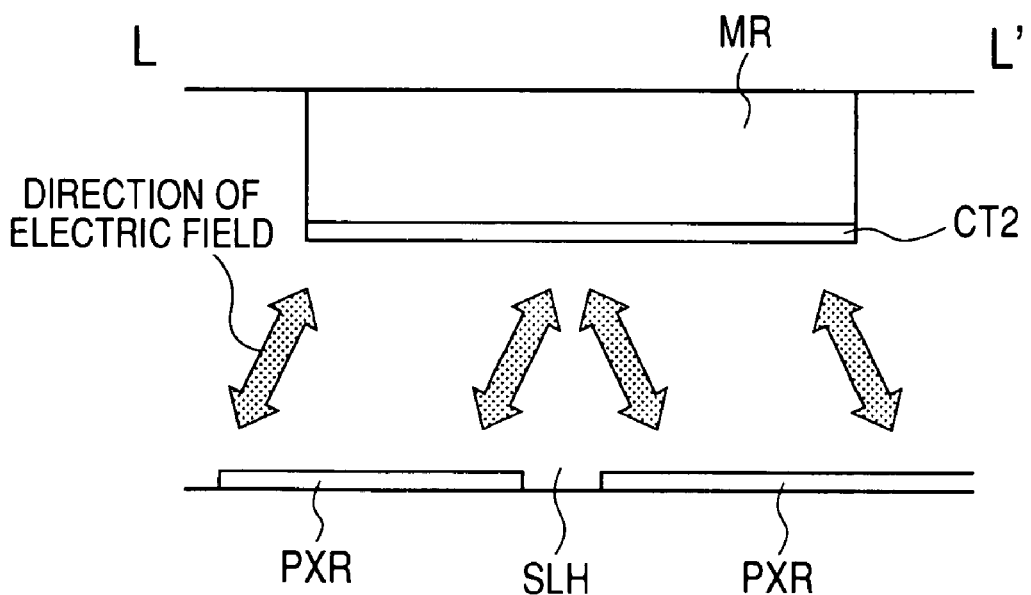
FIG. 11B is a cross-sectional view showing a cross section structure of a transflective liquid crystal display device according to a modified example of the ninth embodiment of the present invention, which corresponds to the cross section structure along the section line L-L' of FIG. 1A.

FIG. 11B is a cross-sectional view showing a cross section structure of a transflective liquid crystal display device according to a modified example of the ninth embodiment of the present invention, which corresponds to the cross section structure along the section line L-L' of FIG. 1A.

On the other hand, in FIG. 11A, in the case where there is no slit (SL1) between the transmissive pixel electrode (PXT) of the transmissive portion 30 and the reflective pixel electrode (PXR) of the reflective portion 31, the orientation control slit (SLH) is defined in the reflective pixel electrode (PXR) of the reflective portion 31 as shown in FIG. 11B, thereby making it possible to prevent the orientation disturbance at that position. As a result, the motion of the orientation disturbance does not adversely affects the display characteristics.

Figure 12:
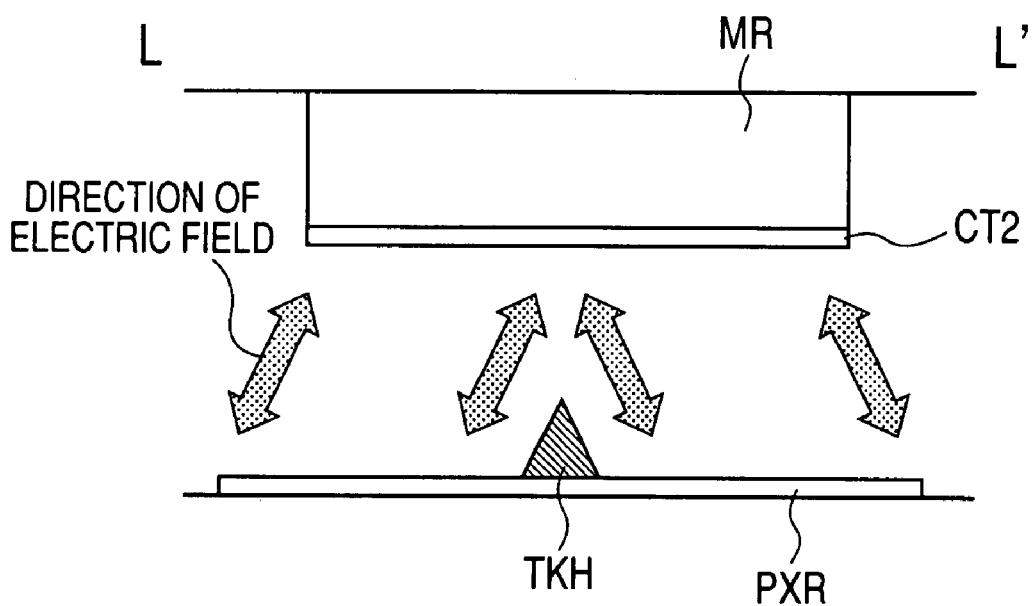
FIG. 12 is a cross-sectional view showing a cross section structure of a transflective liquid crystal display device according to a modified example of the ninth embodiment of the present invention.

FIG. 12 is a cross-sectional view showing a cross section structure of a transflective liquid crystal display device according to a modified example of the ninth embodiment of the present invention.

In the case where the slit between the subpixels is defined outside of the step formation layer (MR), the orientation control projection (TKH) can be disposed on the reflective pixel electrode (PXR) of the reflective portion 31, and even in this case, the same actions and advantages as those in FIG. 11B can be obtained.

Figure 13A:
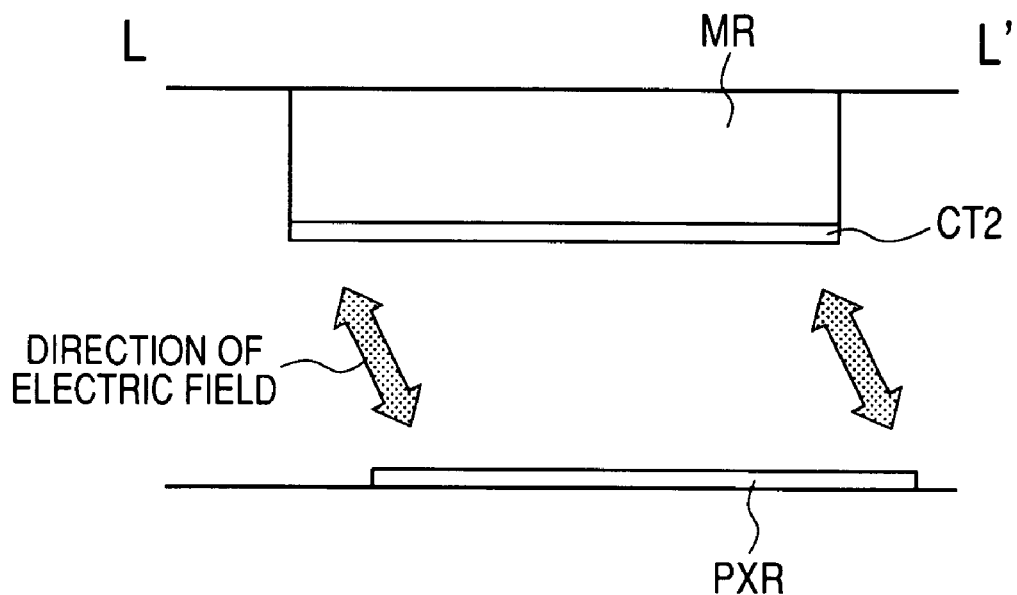
FIG. 13A is a cross-sectional view showing the cross section structure of the transflective liquid crystal display device according to the modified example of the ninth embodiment of the present invention, which corresponds to the cross section structure along the section line L-L' of FIG. 1A.

FIG. 13A is a cross-sectional view showing the cross section structure of the transflective liquid crystal display device according to the modified example of the ninth embodiment of the present invention, which corresponds to the cross section structure along the section line L-L' of FIG. 1A.

In the case where the slit between the subpixels is defined inside of the step formation layer (MR), an oblique electric field is developed as shown in FIG. 13A. In this situation, because the direction of the electric field that is developed in the reflective portion 31 is uniform within the reflective portion, and therefore no orientation disturbance is generated.

Figure 13B:
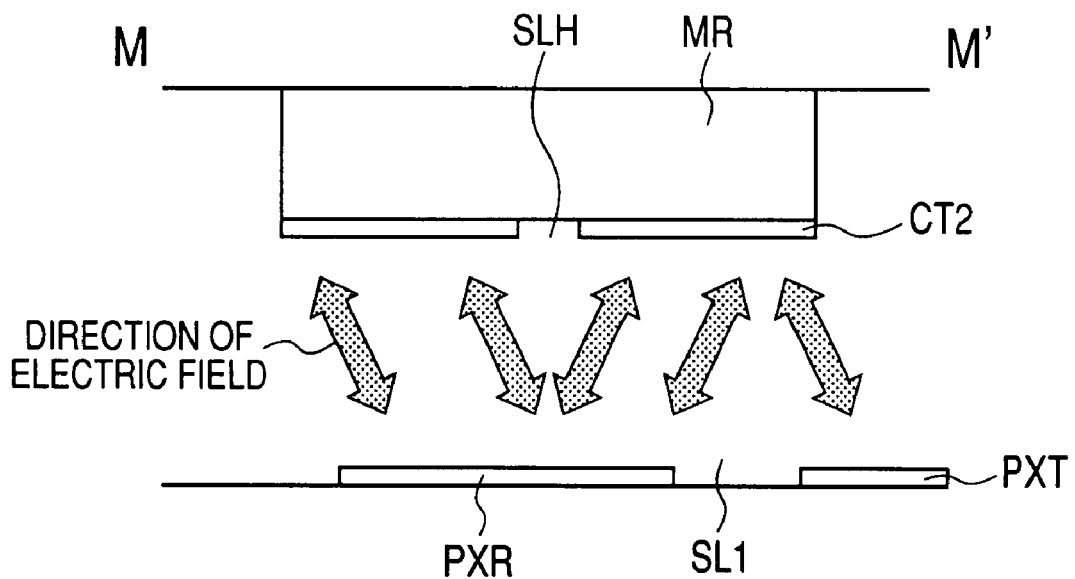
FIG. 13B is a cross-sectional view showing the cross section structure of the transflective liquid crystal display device according to the modified example of the ninth embodiment of the present invention, which corresponds to the cross section structure along the section line M-M' of FIG. 2A.

FIG. 13B is a cross-sectional view showing the cross section structure of the transflective liquid crystal display device according to the modified example of the ninth embodiment of the present invention, which corresponds to the cross section structure along the section line M-M' of FIG. 2A.

On the other hand, in the case where the slit (SL1) is defined between the transparent pixel electrode (PXT) of the transmissive portion 30 and the reflective image electrode (PXR) of the reflective portion 31 inside of the step formation layer (MR), an orientation control slit (SLH) is defined in the second common electrode (CT2) of the reflective portion 31 as shown in FIG. 13B, thereby making it possible to prevent the orientation disturbance at that position. As a result, there is no case in which the orientation disturbance is moved and adversely affects the display characteristic.

Figure 14:
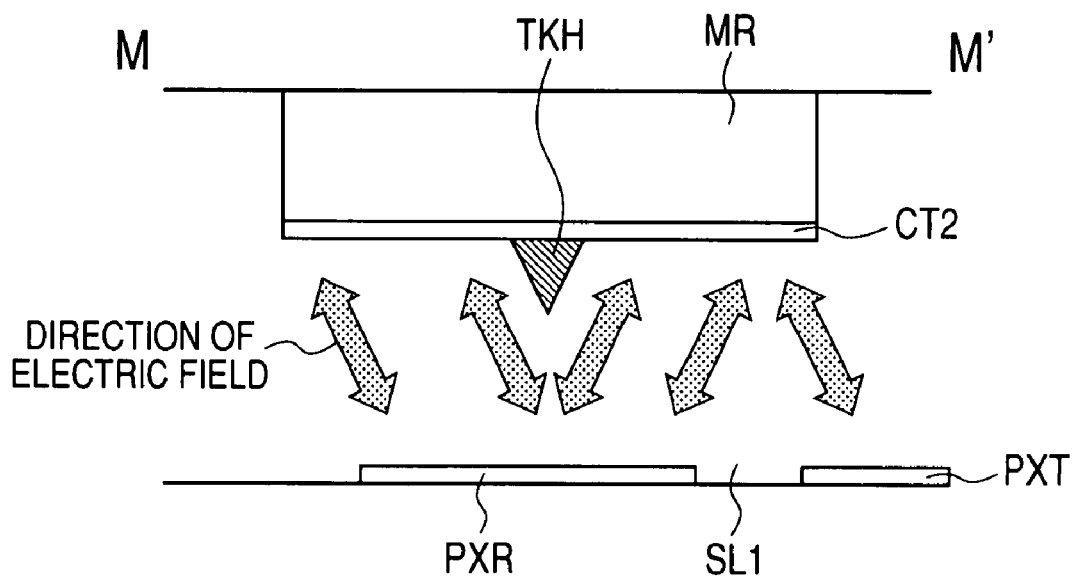
FIG. 14 is a cross-sectional view showing the cross section structure of the transflective liquid crystal display device according to the modified example of the ninth embodiment of the present invention.

FIG. 14 is a cross-sectional view showing the cross section structure of the transflective liquid crystal display device according to the modified example of the ninth embodiment of the present invention.

In the case where the slit (SL1) between the transparent pixel electrode (PXT) of the transmissive portion 30 and the reflective image electrode (PXR) of the reflective portion 31 is disposed inside of the step formation layer (MR), an orientation control projection (TKH) can be disposed in the second common electrode (CT2) of the reflective portion 31 as shown in FIG. 14. Similarly, in this case, the same actions and advantages as those in FIG. 13B can be obtained.

Figure 15A:
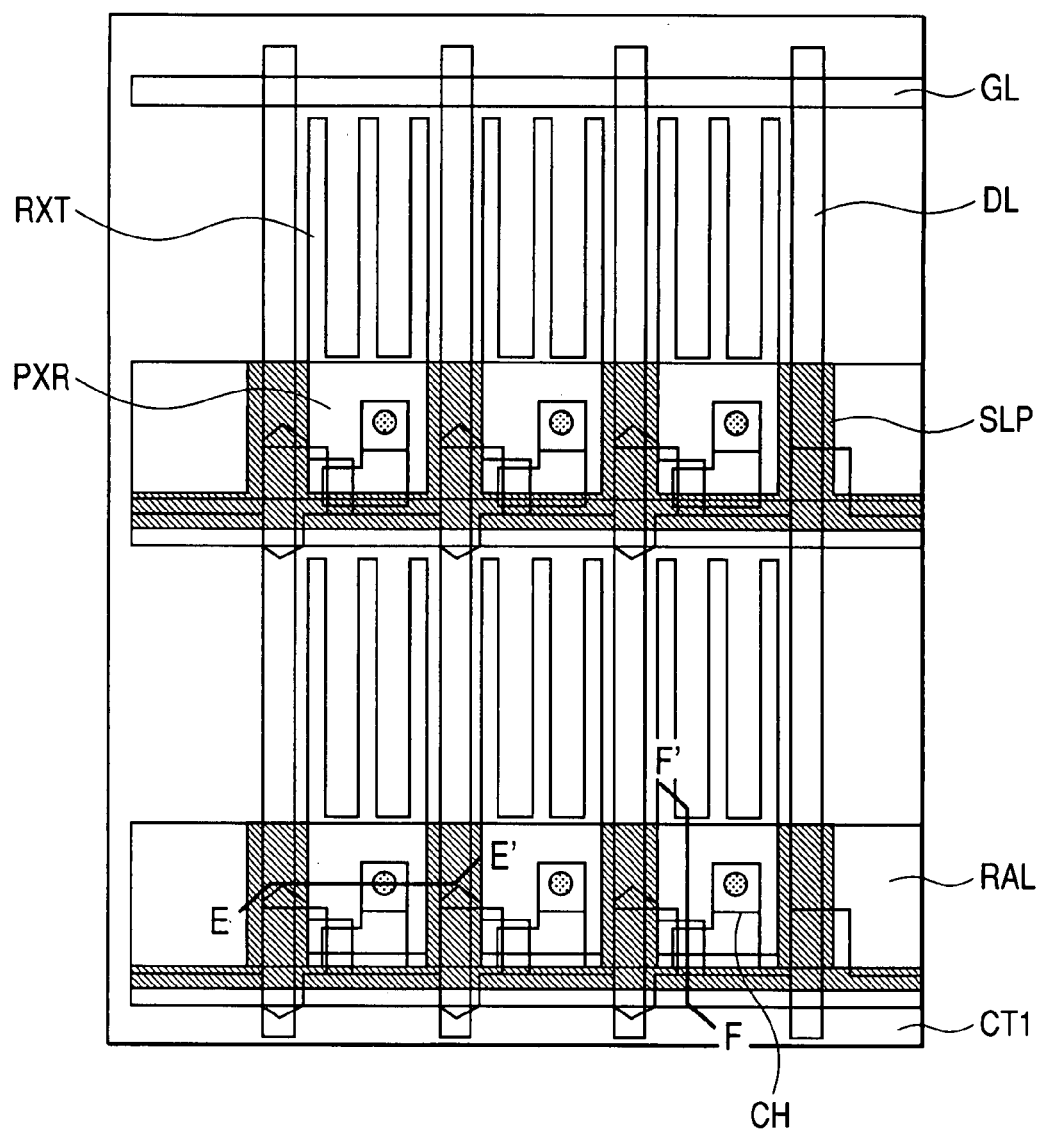
FIG. 15A is a plan view showing an electrode structure of a first substrate side in the transflective liquid crystal display device according to the modified example of the ninth embodiment of the present invention.

FIG. 15A is a plan view showing an electrode structure of a first substrate side in the transflective liquid crystal display device according to the modified example of the ninth embodiment of the present invention.

In the transflective liquid crystal display device shown in FIG. 15A, the reflective electrode (RAL) on the first substrate (SUB1) and the first common electrode (CT1) are patterned to form a slit portion (SLP). The slit portion (SLP) is a portion where none of the reflective electrode (RAL) and the first common electrode (CT1) exists.

In FIG. 15A, the slit portion (SLP) is disposed in a portion which is in contact with three sides that are not adjacent to the transmissive portion 30 among four sides of the reflective portion 31 that is substantially rectangular.

Figure 15B:
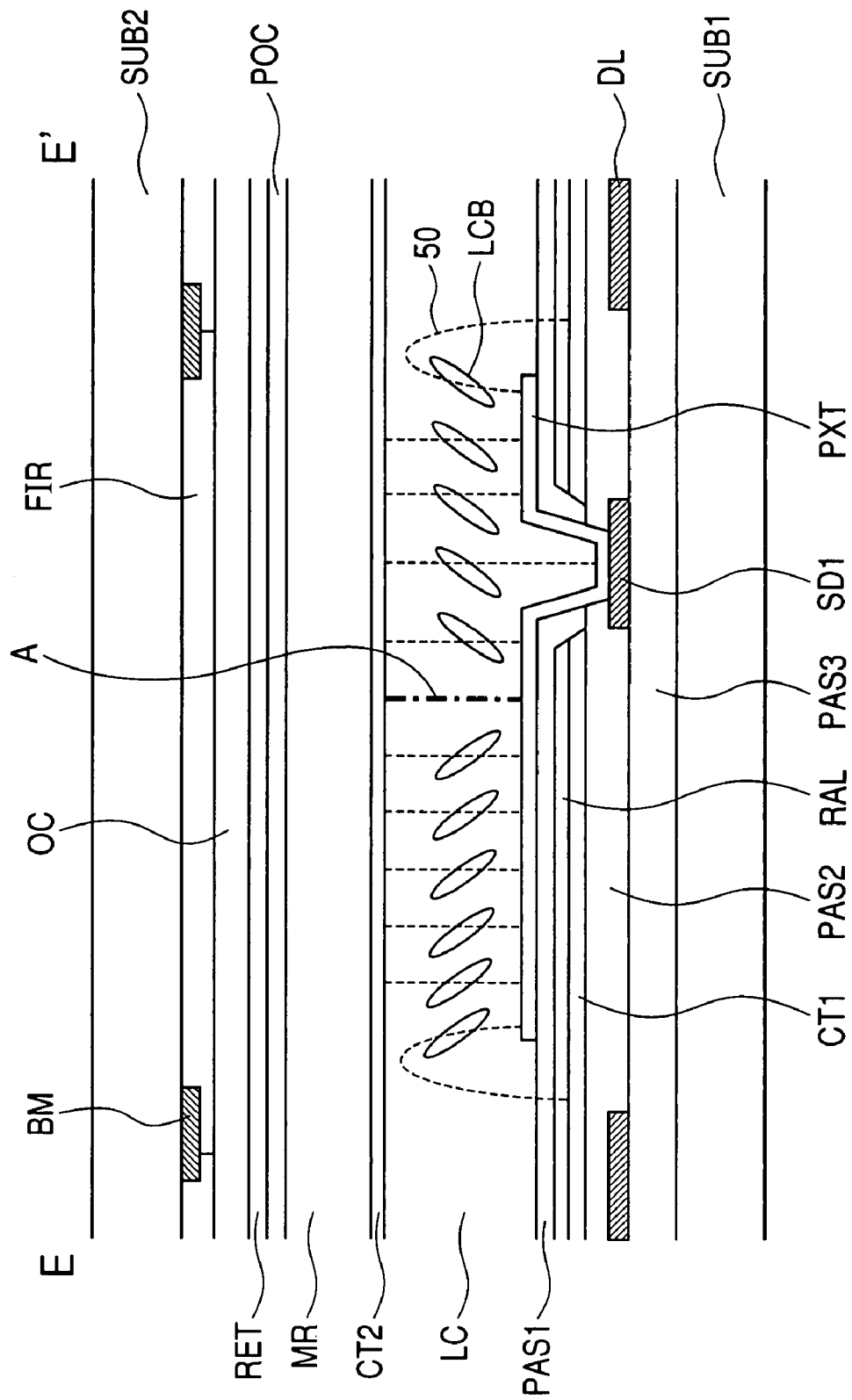
FIG. 15B is a diagram showing the distribution of electric flux lines and a liquid crystal orientation state that is developed by the electric flux lines in a cross section structure along the section line E-E' of FIG. 15A in the case where no slit portion (SLP) is arranged.

FIG. 15B is a diagram showing the distribution of electric flux lines and a liquid crystal orientation state that is developed by the electric flux lines in a cross section structure along the section line E-E' of FIG. 15A in the case where no slit portion (SLP) is arranged.

As shown in FIG. 15B, the electric flux lines directed in a normal direction of the first substrate (SUB1), that is, the electric flux lines corresponding to the vertical electric field are main in the center of the reflective pixel electrode (PXR). In addition, the first common electrode (CT1) exists over the entire surface of the lower layer of the reflective pixel electrode (PXT). As a result, the arch-shaped electric flux lines 50 are developed at both ends of the reflective pixel electrodes (PXR), which are the electric flux lines corresponding to the fringe electric field.

The liquid crystal layer (LC) has a positive dielectric constant anisotropy, and therefore liquid crystal molecules (LCB) change the orientation so as to direct the molecule axis in a direction of the electric flux lines. The oriented films (AI1 and AL2 in FIG. 1B) are so formed as to regulate the orientation change direction at that time. In order to ensure the wide viewing angle in the transmissive portion 30, the tilt angle that is given to the liquid crystal layer (LC) by the oriented film is set to a smaller angle, for example, 2 degrees or lower.

For that reason, the orientation control to the vertical electric field of the oriented film per se is insufficient, and the fringe electric field at both ends of the reflective pixel electrode (PXR) frequently mainly affects the liquid crystal orientation direction at the time of applying the voltage in the reflective portion 31.

The fringe electric field acts so that the liquid crystal directions are opposite to each other at both ends of the reflective pixel electrode (PXR) are opposite to each other. The liquid crystal layer (LC) in the vicinity of the reflective pixel electrode (PXR) is so oriented as to learn the liquid crystal orientation of the reflective pixel electrode ends. For that reason, the orientation state similar to that at the ends is extended up to the vicinity of the center of the reflective pixel electrode (PXR).

As a result, as indicated by a dashed line of A in FIG. 15B, discontinuous boundary is formed on any place of the reflective pixel electrode. This is called "liquid crystal orientation discontinuous portion". The position of the liquid crystal orientation discontinuous portion is not determined, and movable due to a factor such as an applied voltage or an external pressure.

When the position at which the liquid crystal orientation discontinuous portion occurs is different in each of the pixels, the reflectivity within the screen is uniform in the case where the liquid crystal display panel is observed from the oblique direction, which is not preferable. Also, when the liquid crystal orientation discontinuous portion is moved by the voltage supply, the response characteristics are deteriorated. In the case where the moving speed is extremely low, the liquid crystal orientation discontinuous portion is observed as a residual image.

Figure 15C:
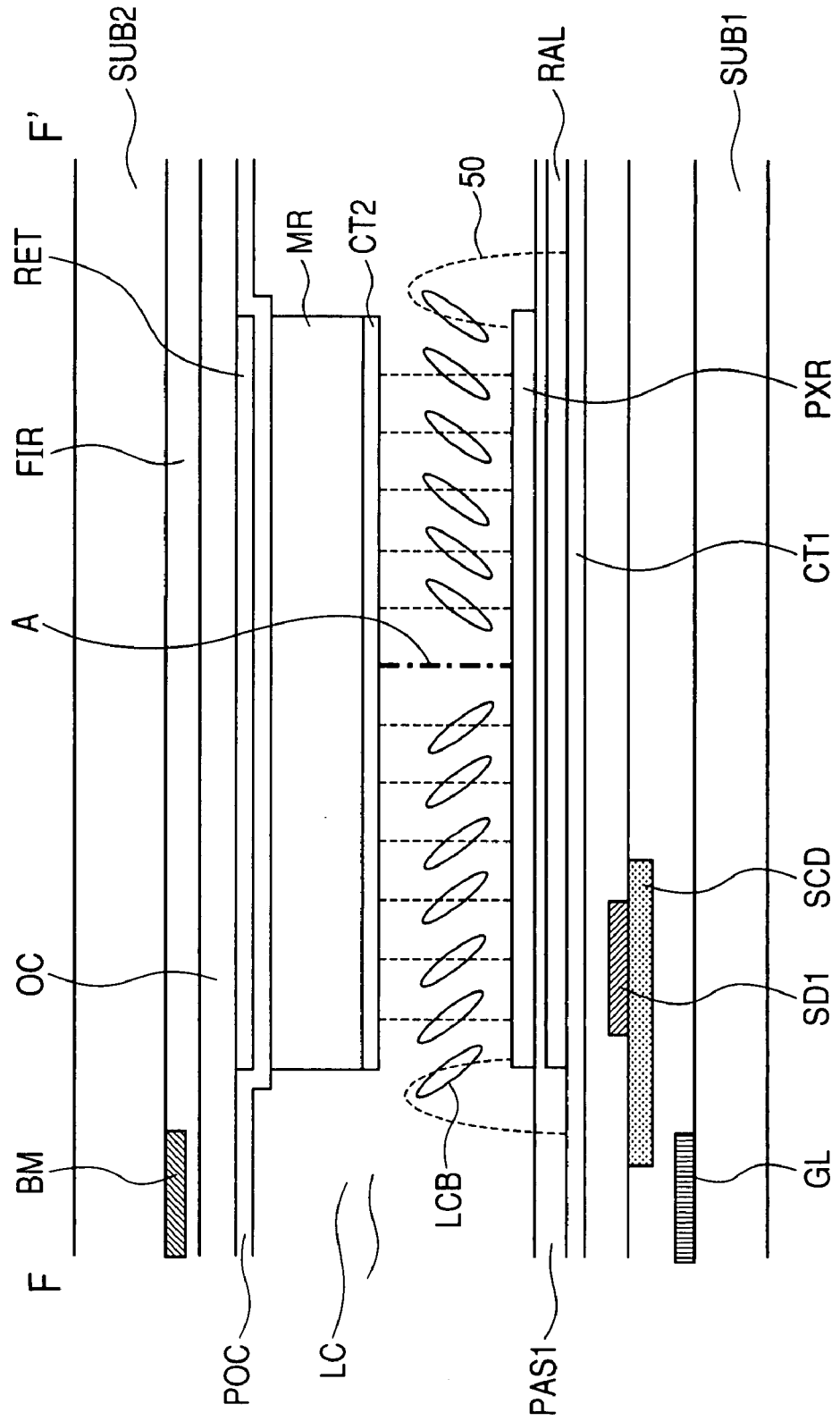
FIG. 15C is a diagram showing the distribution of electric flux lines and a liquid crystal orientation state that is developed by the electric flux lines in a cross section structure along the section line F-F' of FIG. 15A in the case where no slit portion (SLP) is arranged.

FIG. 15C is a diagram showing the distribution of electric flux lines and a liquid crystal orientation state that is developed by the electric flux lines in a cross section structure along the section line F-F' of FIG. 15A in the case where no slit portion (SLP) is arranged.

As shown in FIG. 15C, similarly, in the cross section of F-F' in the case where no slit portion (SLP) is arranged, the fringe electric field is developed at both ends of the reflective pixel electrode (PXR) as in the cross section of E-E' shown in FIG. 15B. As a result, the liquid crystal orientation discontinuous portion frequently occurs.

As described above, in the case where no slit portion (SLP) is arranged, the fringe electric field is developed at four sides of the reflective portion 31, and the reflective portion 31 is surrounded by the fringe electric field at the time of applying a voltage. For that reason, in the case where the orientation restraining force of the oriented film is low, there is a case in which the in-screen reflectivity is nonuniform, the response characteristic is deteriorated, or the residual image is produced.

Figure 15D:
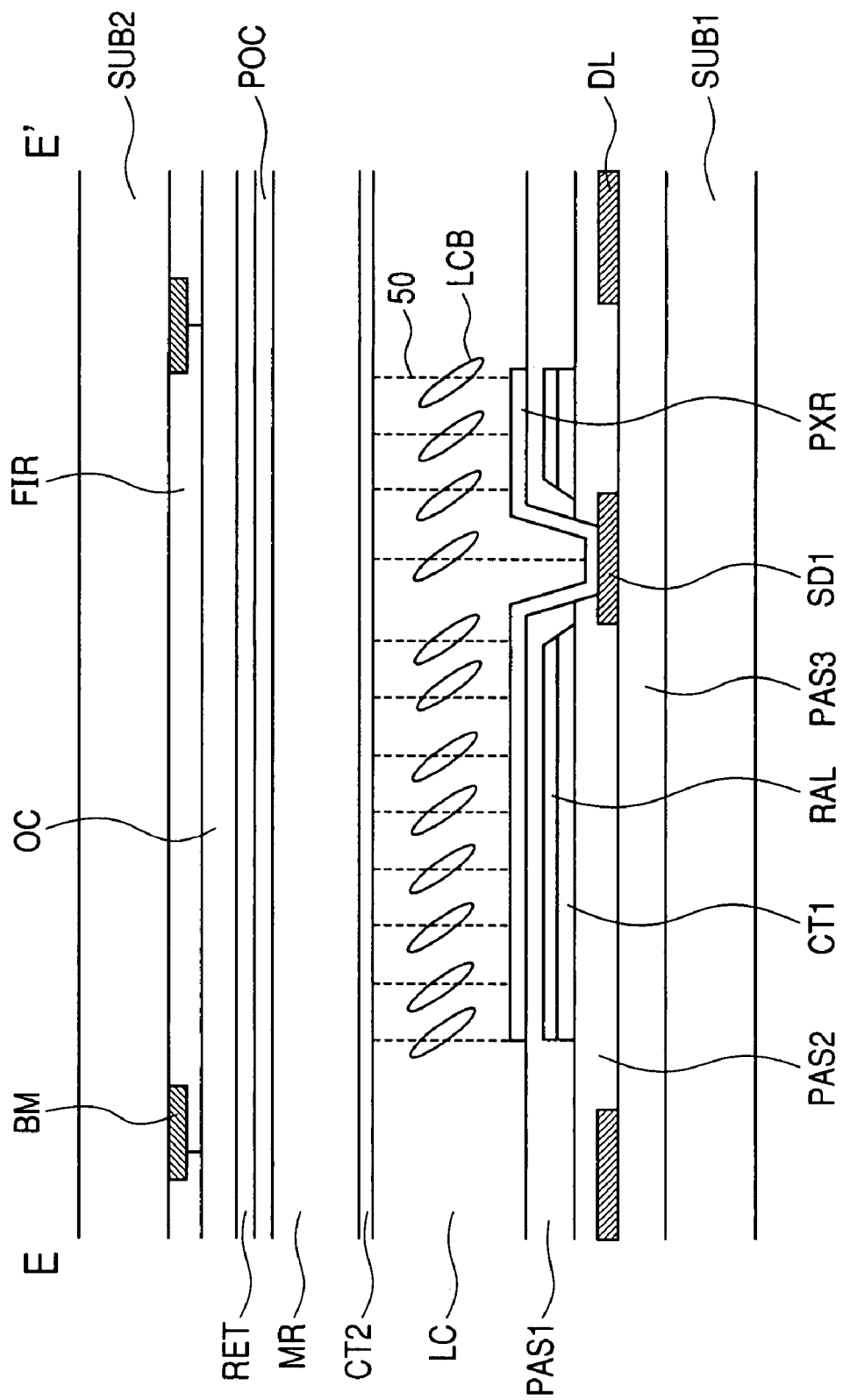
FIG. 15D is a diagram showing the distribution of electric flux lines and a liquid crystal orientation state that is developed by the electric flux lines in the cross section structure along the section line E-E' of FIG. 15A in the case where a slit portion (SLP) is arranged.

FIG. 15D is a diagram showing the distribution of electric flux lines and a liquid crystal orientation state that is developed by the electric flux lines in the cross section structure along the section line E-E' of FIG. 15A in the case where a slit portion (SLP) is arranged.

In the case where the slit portion (SLP) is disposed in the reflective electrode (RAL) and the first common electrode (CT1), the reflective electrode (RAL) and the first common electrode (CT1) have ends at the same positions as the end of the reflective pixel electrode (PXR).

For that reason, an electric field is developed only between the first common electrode (CT1) and the reflective pixel electrode (PXR). Therefore, no fringe electric field is developed at the end of the reflective pixel electrode (PXR), and only a uniform vertical electric field that is developed between the reflective pixel electrode and the second common electrode (CT2) on the second substrate (SUB2) exists on the reflective pixel electrode as shown in FIG. 15D.

FIG. 15E is a diagram showing the distribution of electric flux lines and a liquid crystal orientation state that is developed by the electric flux lines in the cross section structure along the section line F-F' of FIG. 15A in the case where the slit portion (SLP) is arranged.

In the case where the slit portion (SLP) is arranged in the reflective electrode (RAL) and the first common electrode (CT1), the reflective electrode (RAL) and the first common electrode (CT1) have ends at the same positions as the reflective pixel electrode (PXR) at the left end of the reflective pixel electrode (PXR). As a result, no fringe electric field occurs at the left end of the reflective pixel electrode (PXR).

Because the right end of the reflective pixel electrode (PXR) within FIG. 15E comes in contact with the transmissive portion 30, the first common electrode (CT1) extends the end of FIG. 15E beyond the end of the reflective pixel electrode (PXR).

For that reason, the fringe electric field occurs at the right end of the reflective pixel electrode (PXR). In this way, the fringe electric field is developed at only one side of the reflective portion 31 that is substantially rectangular, which is close to the transmissive portion 30.

For that reason, the entire orientation direction of the reflective portion 31 is determined by only the fringe electric field at the end that is close to the transmissive portion 30, no liquid crystal orientation discontinuous portion appears, and the uniform orientation is obtained over the entire reflective portion. Accordingly, the in-screen reflectivity is not nonuniform, the response characteristic is not deteriorated, and no residual image is produced.

Figure 16:
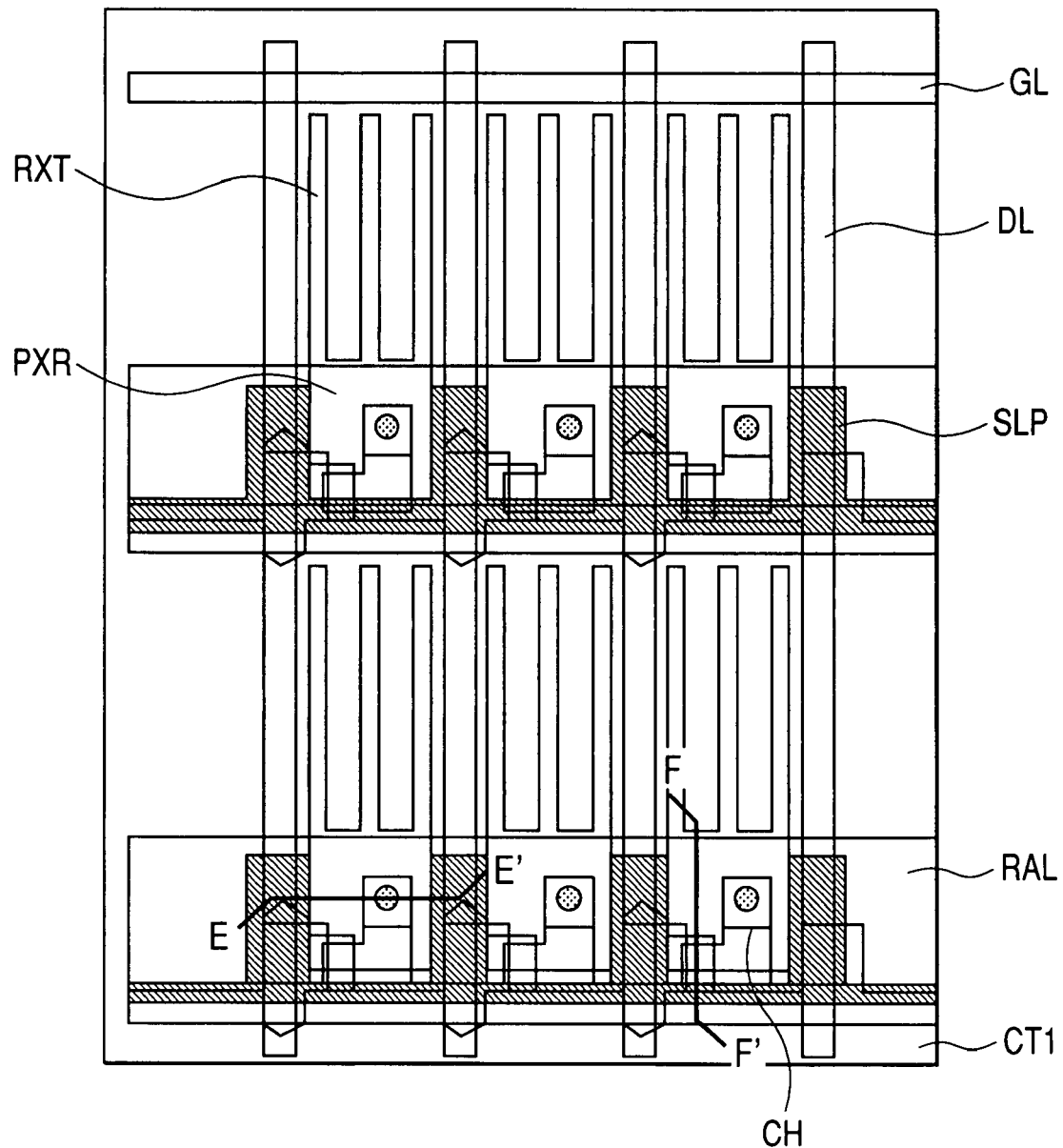
FIG. 16 is a plan view showing an electrode structure of a first substrate side in a transflective liquid crystal display device according to a modified example of the ninth embodiment of the present invention.

FIG. 16 is a plan view showing an electrode structure of a first substrate side in a transflective liquid crystal display device according to a modified example of the ninth embodiment of the present invention.

In FIG. 16, the slit portion (SLP) does not reach the boundary of the reflective portion 31 and the transmissive portion 30. For that reason, the reflective electrodes (RAL) of the respective subpixels are coupled with each other.

In the case where the slit portion (SLP) exists, the laminate structure consisting of the reflective electrode (RAL) and the first common electrode (CT1) has a stripe-like distribution. In FIG. 15A, the reflective electrode (RAL) is bisected by the slit portion (SLP) and remains in an island shape on the reflective portion 31 of the respective subpixels.

The reflective electrode (RAL) is made of a metal having a low resistance such as aluminum, and divided into the island shapes. As a result, the resistance of the laminate layer consisting of the reflective electrode (RAL) and the first common electrode (CT1) is determined by, for example, the first common electrode (CT1) that is formed of a transparent conductive film of ITO.

In the structure shown in FIG. 16, the slit portion (SLP) is coupled with the reflective electrode (RAL) with the result that the resistance of the laminate film of the reflective electrode (RAL) and the first common electrode (CT1) is determined by the reflective electrode (RAL). For that reason, the resistance becomes lower, the voltage distribution hardly occurs in changing the common voltage on the first common electrode (CT1), and luminance gradient hardly occurs.

Figure 17:
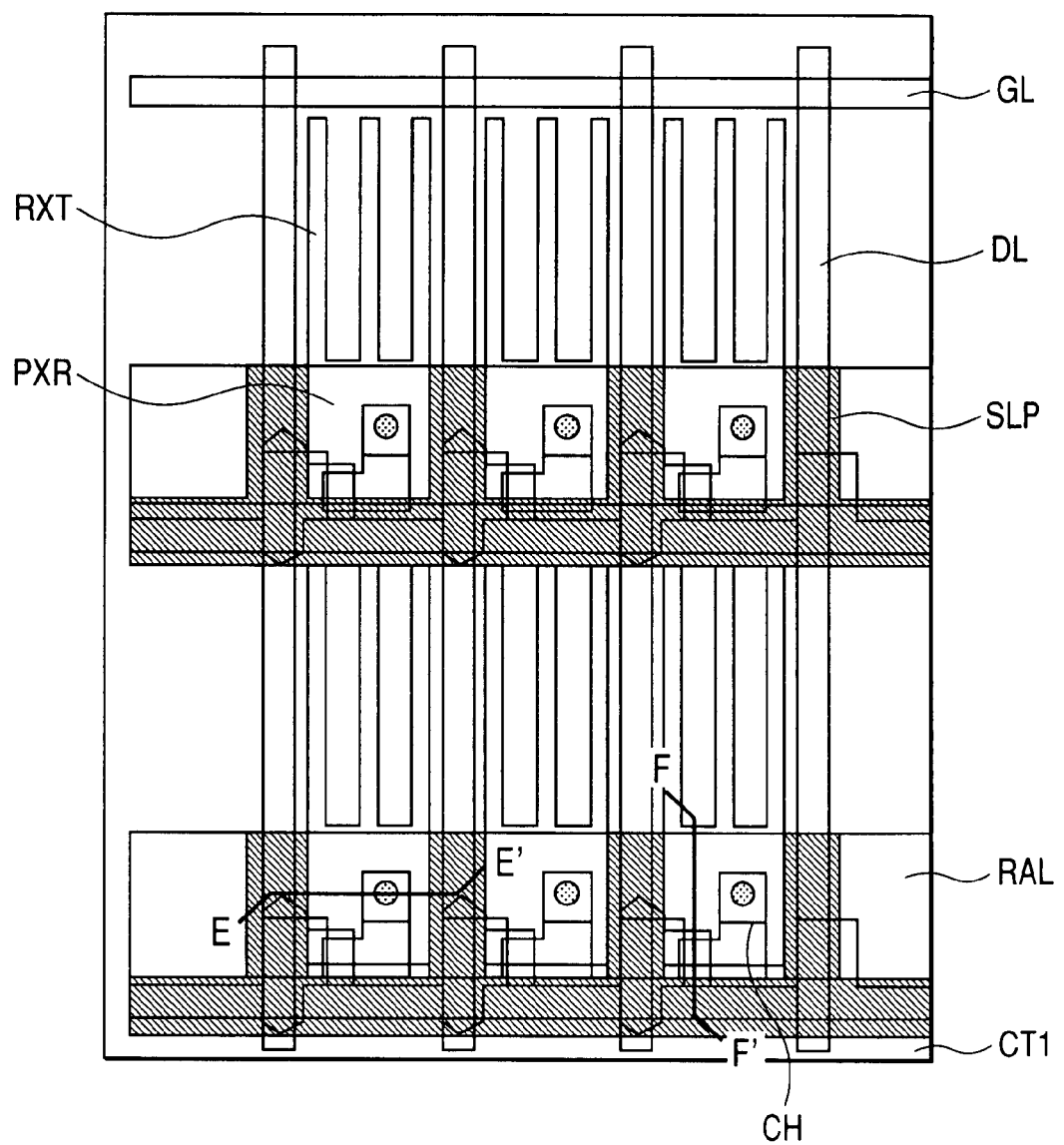
FIG. 17 is a plan view showing the electrode structure of the first substrate side in the transflective liquid crystal display device according to the modified example of the ninth embodiment of the present invention.

FIG. 17 is a plan view showing the electrode structure of the first substrate side in the transflective liquid crystal display device according to the modified example of the ninth embodiment of the present invention.

In the structure shown in FIG. 15A, because the slit portion (SLP) does not extend up to a region beyond the scanning line (GL), the fringe electric field that is in parallel to the pectinate direction is developed at the leading end of the pectinate electrode of the transmissive pixel electrode (PXT) to form a core of the moving domain.

In the structure shown in FIG. 17, the slit portion (SLP) exceeds the scanning line (GL), straddles the adjacent subpixel, and extends up to the leading end of the pectinate structure of the pectinate electrode of the transmissive pixel electrode (PXT).

For that reason, the fringe electric field is not developed at the leading end of the pectinate structure of the pectinate electrode of the transmissive pixel electrode (PXT). The moving domain is not generated from the pectinate leading end.

Tenth Embodiment

Figure 18A:
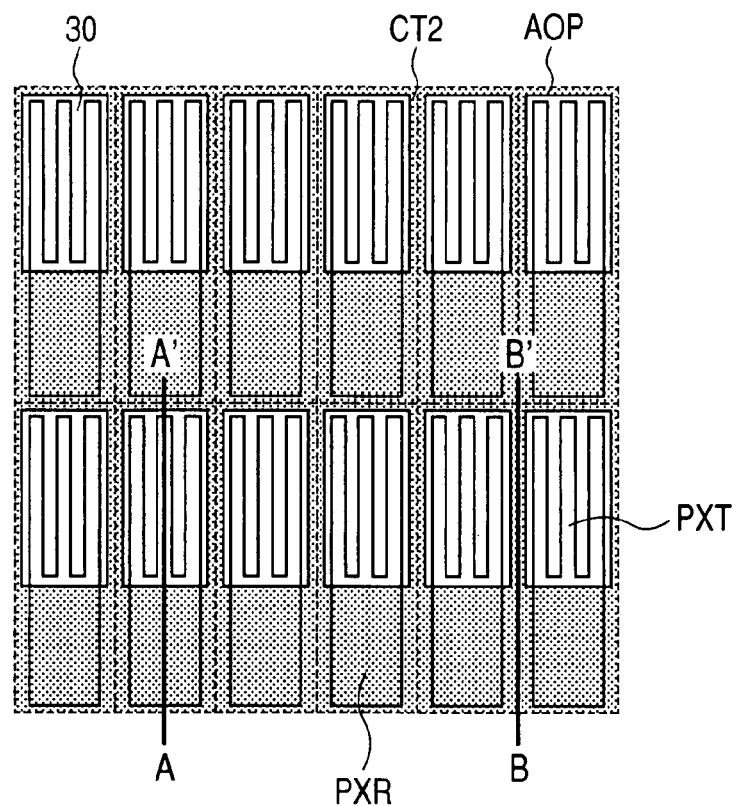
FIG. 18A is a plan view showing an electrode structure of a first substrate side and a second substrate side in a transflective liquid crystal display device according to a tenth embodiment of the present invention.

FIG. 18A is a plan view showing an electrode structure of a first substrate side and a second substrate side in a transflective liquid crystal display device according to a tenth embodiment of the present invention.

Figure 18B:
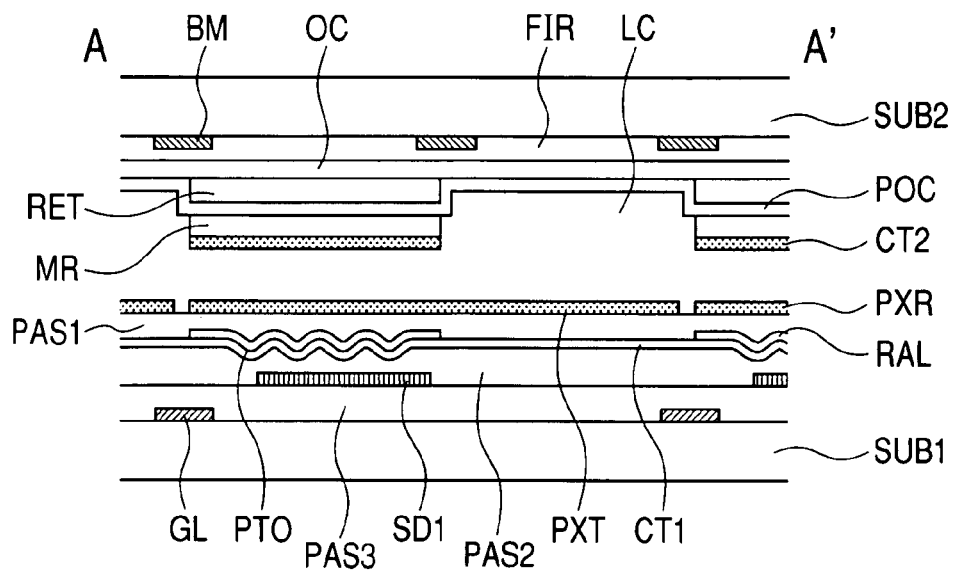
FIG. 18B is a cross-sectional view showing a cross section structure taken along a section line A-A' of FIG. 18A.
Figure 18C:
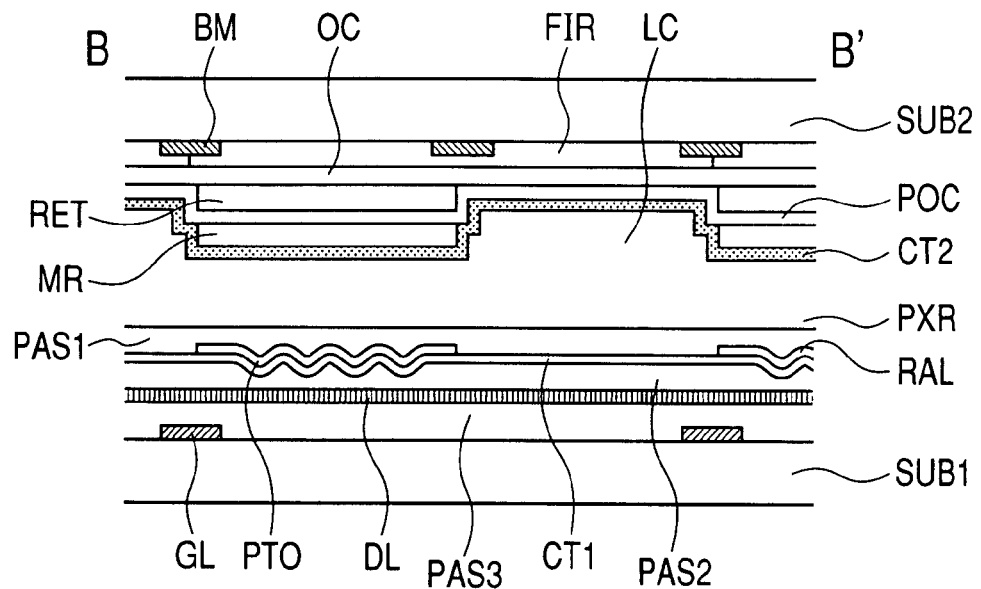
FIG. 18C is a cross-sectional view showing a cross section structure taken along a section line B-B' of FIG. 18A.

FIG. 18B is a cross-sectional view showing a cross section structure taken along a section line A-A' of FIG. 18A. FIG. 18C is a cross-sectional view showing a cross section structure taken along a section line B-B' of FIG. 18A.

In the first embodiment to the ninth embodiment, the second common electrode (CT2) at the second substrate (SUB2) side is formed in a planar shape (or a rectangular shape), that is, in a stripe shape in correspondence with the reflective portion 31 of the respective subpixels on one display line.

In the transflective liquid crystal display device according to this embodiment, the second common electrode (CT2) at the second substrate (SUB2) side has an opening (AOP) at a portion corresponding to the transmissive portion 30, and is then formed over the entire surface of the second substrate (SUB2).

With the above configuration, it is possible to make the resistance of the second common electrode (CT2) lower than the case in which the second common electrode (CT2) is formed in a stripe shape. In this embodiment, the concavo-convex pattern (PTC) is formed in the reflective portion 31. Similarly, in the above respective embodiments as well as respective embodiments that will be described later, the concavo-convex pattern (PTO) can be formed in the reflective portion 31.

Eleventh Embodiment

Figure 19A:
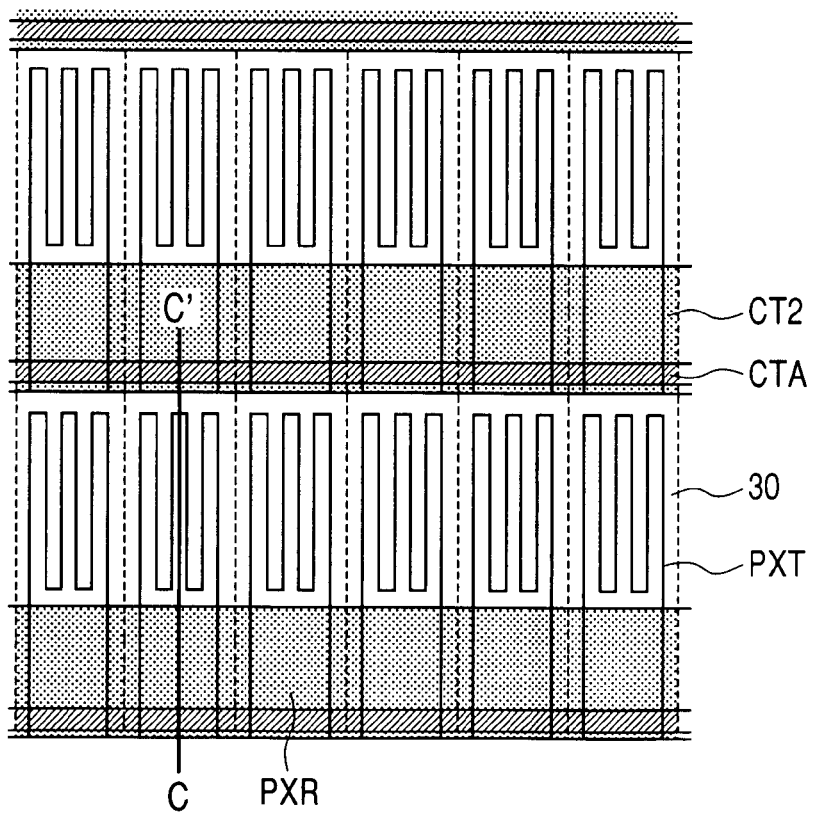
FIG. 19A is a plan view showing an electrode structure of a first substrate side and a second substrate side in a transflective liquid crystal display device according to an eleventh embodiment of the present invention.

FIG. 19A is a plan view showing an electrode structure of a first substrate side and a second substrate side in a transflective liquid crystal display device according to an eleventh embodiment of the present invention.

Figure 19B:
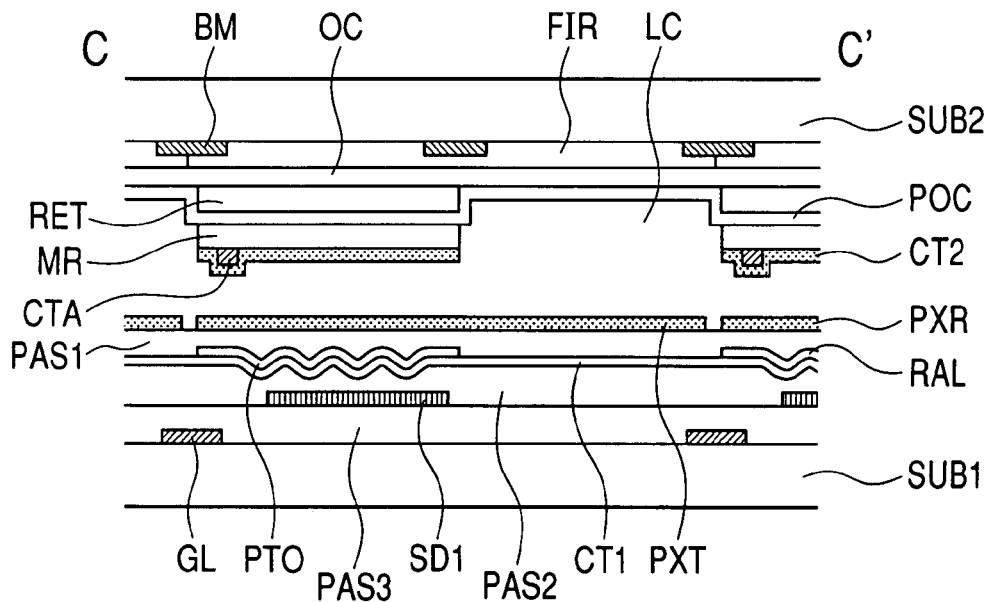
FIG. 19B is a cross-sectional view showing a cross section structure taken along a section line C-C' of FIG. 19A.

FIG. 19B is a cross-sectional view showing a cross section structure taken along a section line C-C' of FIG. 19A.

In the first embodiment to the ninth embodiment as described above, the second common electrode (CT2) at the second substrate (SUB2) side is formed in a planar shape (or a rectangular shape), that is, in a stripe shape in correspondence with the reflective portion 31 of the respective subpixels on one display line.

Similarly, in the transflective liquid crystal display device according to this embodiment, the second common electrode (CT2) at the second substrate (SUB2) side is formed in a stripe shape. However, in this embodiment, a low-resistant common electrode (CTA) that is made of a metal layer such as aluminum is superimposed on the end of the second common electrode (CT2). With the above configuration, it is possible to make the resistance of the second common electrode (CT2) lower than the case in which the second common electrode (CT2) is simply formed in a stripe shape.

Twelfth Embodiment

Figure 20A:
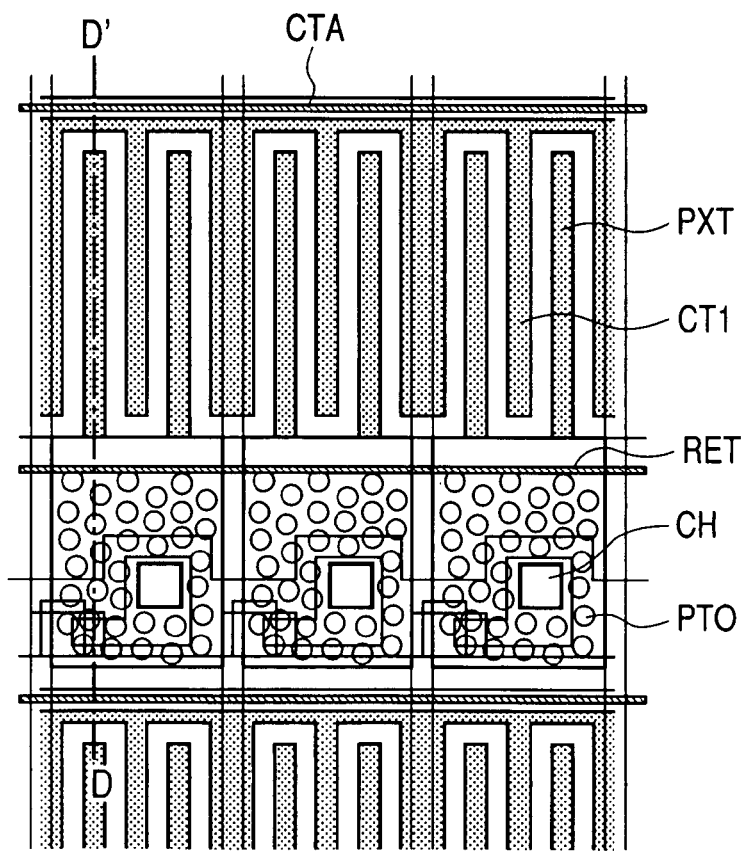
FIG. 20A is a plan view showing an electrode structure of a first substrate side and a second substrate side in a transflective liquid crystal display device according to a twelfth embodiment of the present invention.

FIG. 20A is a plan view showing an electrode structure of a first substrate side and a second substrate side in a transflective liquid crystal display device according to a twelfth embodiment of the present invention.

Figure 20B:
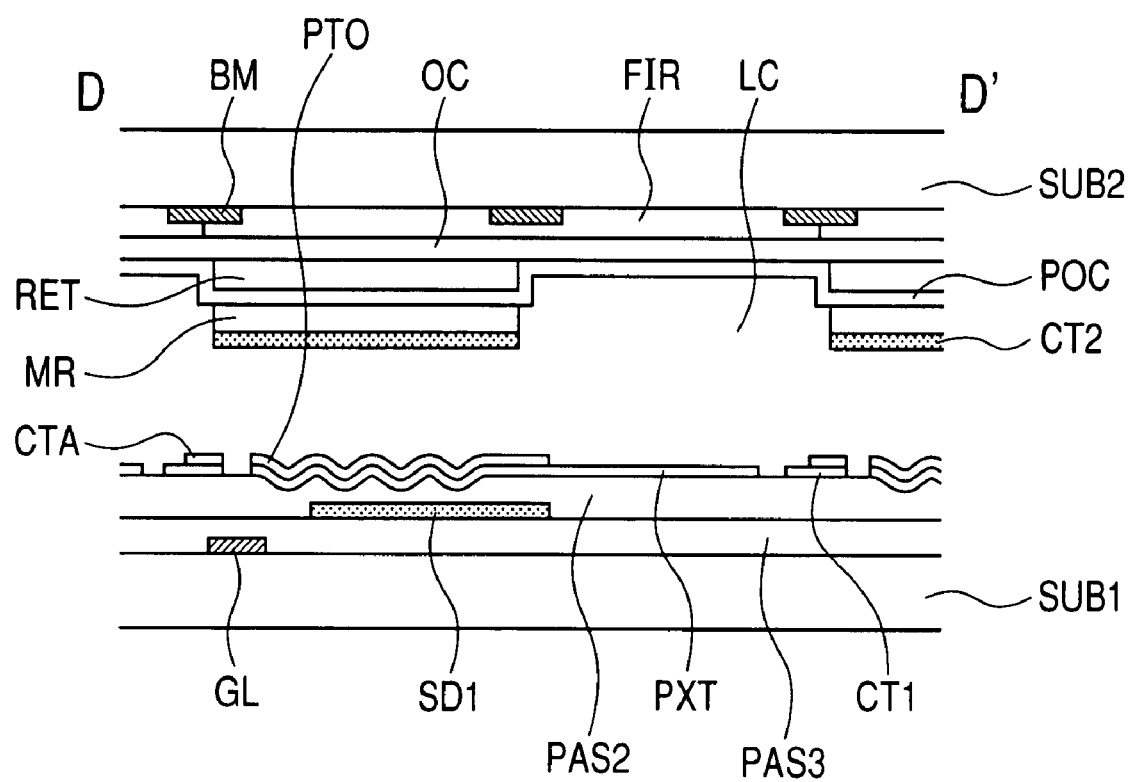
FIG. 20B is a cross-sectional view showing a cross section structure taken along a section line D-D' of FIG. 20A.

FIG. 20B is a cross-sectional view showing a cross section structure taken along a section line D-D' of FIG. 20A.

In this embodiment, the first common electrode (CT1) of the first substrate is formed at the same position as that of the transmissive pixel electrode (PXT). That is, in this embodiment, the first common electrode (CT1) has the pectinate electrode having plural pectinate electrodes. As shown in FIG. 20A, the pectinate electrode of the transmissive pixel electrode (PXT) and the pectinate electrode of the first common electrode (CT1) are arranged opposite to each other.

Also, in this embodiment, the reflective electrode (RAL) is formed on the planar reflective pixel electrode (PXR).

Also, in this embodiment, a low-resistant common wiring (CTA) that is formed in the same process as that of the reflective electrode (RAL) and made of the same metal layer as that of the reflective electrode (RAL) is superimposed on a connecting portion that couples the respective pectinate electrodes of the first common electrode (CT1) with each other.

In this embodiment, the first common electrode (CT1) is divided into the stripe shape, but the low-resistant common wiring (CTA) is superimposed on the first common electrode (CT1). With the above configuration, it is possible to make the resistance of the first common electrode (CT1) lower than the case in which the first common electrode (CT1) is simply formed in a stripe shape.

Thirteenth Embodiment

FIGS. 21A and 21B are diagrams for explaining a problem with the transflective liquid crystal display device of the present invention.

As shown in FIG. 21A, the transflective liquid crystal display device according to the present invention is divided into a vertical orientation region (VAR) that is mainly positioned at the reflective portion 31, and a horizontal orientation region (HAR) that is mainly positioned at the transmissive portion 3 in a state where a voltage is applied to the liquid crystal layer (LC).

In general, when a pushing force is applied to the liquid crystal display panel, a compression stress is applied to the liquid crystal layer (LC). In this embodiment, because the thickness of the liquid crystal layer (LC) of the reflective portion 31 is thinner than that of the transmissive portion 30, the ratio of a change in the thickness of the liquid crystal layer (LC) to the thickness of the liquid crystal layer (LC) in the reflective portion 31 is larger than that in the transmissive portion 30.

Then, when it is assumed that the volume ratio of the vertical orientation region (VAR) and the horizontal orientation region (HAR) does not change between before and after the exertion of the pushing force, the vertical orientation region (VAR) is projected to the horizontal orientation region (HAR) as shown in FIG. 21B.

The orientation state of the vertical orientation region (VAR) which has been projected to the horizontal orientation region (HAR) affects the horizontal orientation region (HAR), to thereby increase the possibility that a reverse tilt domain that reverses the tilt up direction of the liquid crystal molecules of the horizontal orientation occurs.

When the reverse tilt domain occurs, the luminance of the subpixel is made lower than other normal subpixels, which is recognized as an abnormal display.

Figure 22:
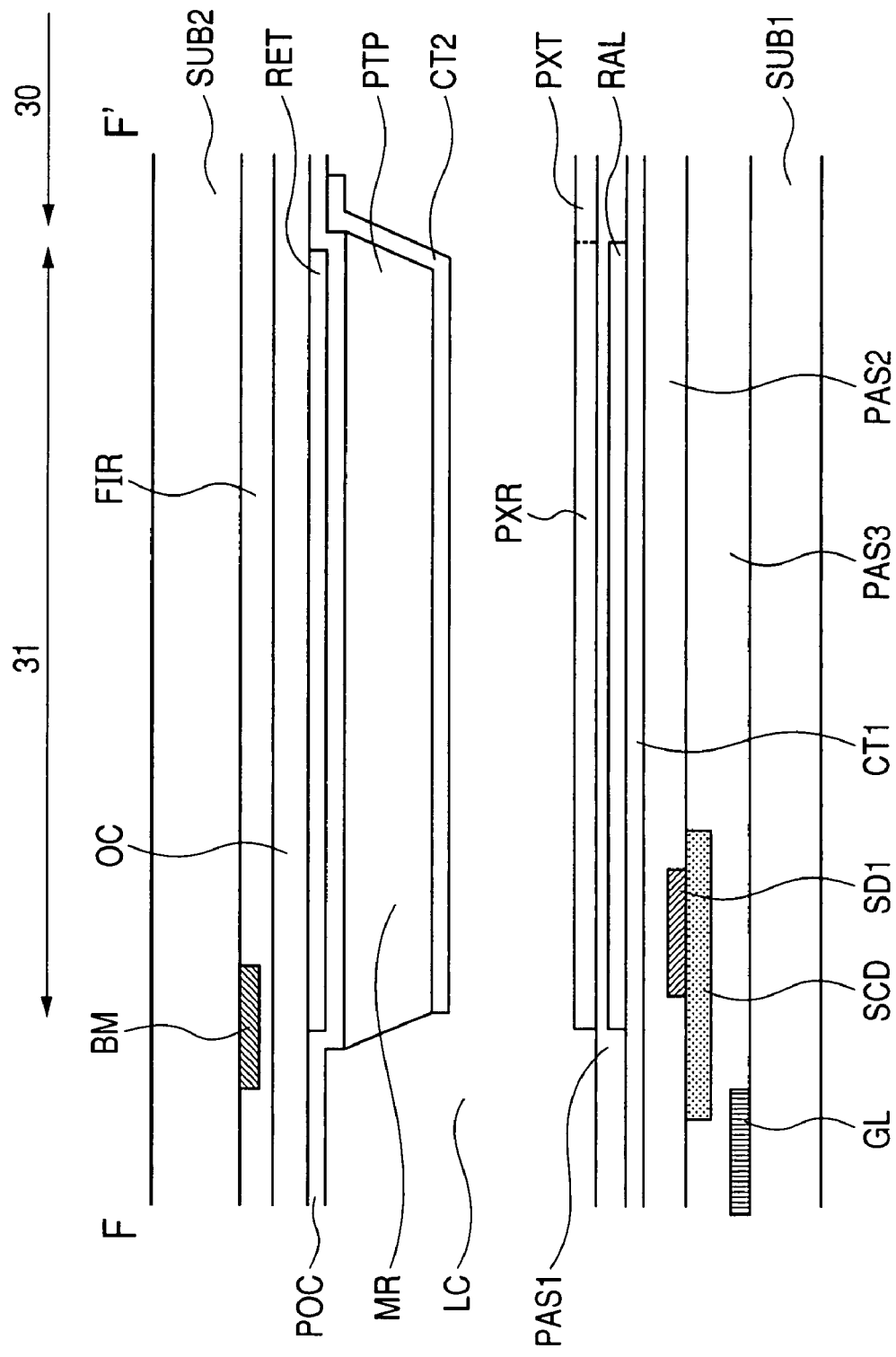
FIG. 22 is a cross-sectional view showing the cross section structure of a transflective liquid crystal display device according to a thirteen embodiment of the present invention, which shows the cross section structure of a portion corresponding to FIG. 1E.

FIG. 22 is a cross-sectional view showing the cross section structure of a transflective liquid crystal display device according to a thirteen embodiment of the present invention, which shows the cross section structure of a portion corresponding to FIG. 1E.

As shown in FIG. 22, in this embodiment, the step formation layer (MR) has a tapered portion (PTP) in the boundary of the transmissive portion 30 and the reflective portion 31, the second common electrode (CT2) is extended to the bottom of the tapered portion (PTP) of the step formation layer (MR), and the leading end is positioned in the region of the transmissive portion 30.

In order to prevent the occurrence of the reverse tilt domain which is attributable to the pressure, it is preferable to project a part of the second common electrode (CT2) to the transmissive portion 30 as shown in FIG. 22. With the above configuration, because a region to which the vertical electric field is always applied exists at the end of the transmissive portion 30, the generate reverse tilt domain can be reduced.

In the case where no vertical electric field region exists in the end of the transmissive portion 30, the voltage remains until the voltage is decreased because there is no route for reducing the reverse tilt domain.

The present invention that has been made by the present inventors has been described in detail on the basis of the embodiments. However, the present invention is not limited to the above embodiments, and it will be obvious to those skilled in the art that various changes may be made without departing from the scope of the invention.

What is claimed is:

1. A transflective liquid crystal display device comprising:
a liquid crystal display panel having a first substrate, a second substrate, and a liquid crystal interposed between the first substrate and the second substrate in which the liquid crystal display panel includes a plurality of subpixels having a transmissive portion and a reflective portion,
wherein the transmissive portion of each of the plurality of subpixels includes a first common electrode formed on the first substrate, and a transmissive pixel electrode formed on the first common electrode through an interlayer insulating film,
wherein the transmissive pixel electrode has a plurality of pectinate electrodes or slits, and
wherein the reflective portion of each of the plurality of subpixels includes a reflective electrode formed on the first common electrode, a planar reflective pixel electrode formed on the first common electrode through the interlayer insulating film, second common electrodes formed on the second substrate, and a retarder formed between the second common electrodes and the second substrate.

2. The transflective liquid crystal display device according to claim 1,
wherein the transmissive pixel electrode includes a plurality of pectinate electrodes, each of the plurality of pectinate electrodes has an oblique portion at one end of the reflective pixel electrode side so that an interval between the oblique portion and the other pectinate electrode becomes gradually larger, and a leading end of the pectinate electrode at the opposite side of the reflective pixel electrode is hooked.

3. The transflective liquid crystal display device according to claim 1,
wherein the reflective portion of each of the plurality of subpixels has a reflective pixel electrode having a plurality of pectinate electrodes or slits instead of the planar reflective pixel electrode.

4. A transflective liquid crystal display device comprising:
a liquid crystal display panel having a first substrate, a second substrate, and a liquid crystal interposed between the first substrate and the second substrate in which the liquid crystal display panel includes a plurality of subpixels having a transmissive portion and a reflective portion,
wherein the transmissive portion of each of the plurality of subpixels includes a transmissive pixel electrode having a plurality of pixel pectinate electrodes and a first common electrode having a plurality of common pectinate electrodes which are disposed between the respective pixel pectinate electrodes of the transmissive pixel electrode, and
wherein the reflective portion of each of the plurality of subpixels includes a planar reflective pixel electrode formed at a position of the same layer as that of the transmissive pixel electrode, a reflective electrode formed on the planar reflective pixel electrode, second common electrodes formed on the second substrate, and a retarder formed between the second common electrodes and the second substrate.

5. The transflective liquid crystal display device according to claim 1,
wherein the reflective portion of each of the plurality of subpixels has a reflective pixel electrode having a plurality of pectinate electrodes instead of the planar reflective pixel electrode.

6. A transflective liquid crystal display device comprising:
a liquid crystal display panel having a first substrate, a second substrate, and a liquid crystal interposed between the first substrate and the second substrate in which the liquid crystal display panel includes a plurality of subpixels having a transmissive portion and a reflective portion,
wherein the transmissive portion of each of the plurality of subpixels includes a transmissive pixel electrode formed on the first substrate and a first common electrode formed on the first substrate,
wherein the reflective portion of each of the plurality of subpixels includes a planar reflective pixel electrode formed at a position of the same layer as that of the transmissive pixel electrode, a reflective electrode, and second common electrodes formed on the second substrate,
wherein a step formation layer is formed between the second common electrodes and the second substrate,
wherein the step formation layer has a tapered boundary portion between the transmissive portion and the reflective portion of each of the sub-pixels, and wherein the second common electrodes extend to a tapered bottom portion of the step formation layer, and each leading portion of the second common electrodes is positioned in the transmissive region of each of the subpixels.

7. The transflective liquid crystal display device according to claim 1,
wherein the reflective portion of each of the subpixels is disposed in the center of each of the subpixels in a first direction orthogonal to a display line, and
wherein the transmissive portion of each of the subpixels is disposed at both sides of the reflective portion in the first direction.

8. The transflective liquid crystal display device according to claim 1,
wherein the reflective electrode is formed of a metal layer having a high reflectivity.

9. The transflective liquid crystal display device according to claim 1,
wherein the transmissive pixel electrode is integrated with the reflective pixel electrode, and
wherein a slit is formed between the transmissive pixel electrode and the reflective pixel electrode.

10. The transflective liquid crystal display device according to claim 1,
wherein a video voltage is applied to the transmissive pixel electrode and the reflective pixel electrode, independently.

11. The transflective liquid crystal display device according to claim 1,
wherein an orientation control slit is formed in the reflective pixel electrode.

12. The transflective liquid crystal display device according to claim 1,
wherein an orientation control dielectric projection is formed on the reflective pixel electrode.

13. The transflective liquid crystal display device according to claim 1,
wherein an orientation control slit is formed on the second common electrodes.

14. The transflective liquid crystal display device according to claim 1,
wherein an orientation control dielectric projection is formed on the second common electrodes.

15. The transflective liquid crystal display device according to claim 1,
wherein the first common electrode has an orientation control slit formed at a portion that comes in contact with at least one side of the reflective portion of each of the subpixels.

16. The transflective liquid crystal display device according to claim 1,
wherein the reflective electrode is formed with an orientation control slit, and
wherein one reflective electrode on one display line is connected with the reflective electrode is connected to another reflective electrode that is adjacent to the one reflective electrode at portions where no orientation control slits of the reflective electrodes are formed.

17. The transflective liquid crystal display device according to claim 1,
wherein the first common electrode is divided in each of the display lines.

18. The transflective liquid crystal display device according to claim 17,
wherein a metal layer that forms the reflective electrode is formed on at least a part of the first common electrode.

19. The transflective liquid crystal display device according to claim 1,
wherein the second common electrodes are integrally so formed as to cover the plurality of subpixels on the second substrate, and has an opening portion at a portion of each of the subpixels opposite to the transmissive portion.

20. The transflective liquid crystal display device according to claim 1,
wherein the second common electrodes are of a laminate structure of a transparent electrode and a low resistant metal wiring.

* * * * *